United States Patent
Iseki et al.

(10) Patent No.: US 11,608,543 B2
(45) Date of Patent: *Mar. 21, 2023

(54) OXIDE ORE SMELTING METHOD

(71) Applicant: SUMITOMO METAL MINING CO., LTD., Tokyo (JP)

(72) Inventors: Takashi Iseki, Niihama (JP); Yukihiro Goda, Niihama (JP); Jun-ichi Kobayashi, Niihama (JP); Shuji Okada, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 16/094,493

(22) PCT Filed: Apr. 26, 2017

(86) PCT No.: PCT/JP2017/016620
§ 371 (c)(1),
(2) Date: Oct. 18, 2018

(87) PCT Pub. No.: WO2017/188344
PCT Pub. Date: Nov. 2, 2017

(65) Prior Publication Data
US 2019/0119779 A1    Apr. 25, 2019

(30) Foreign Application Priority Data

Apr. 27, 2016 (JP) .............................. JP2016-089469
Apr. 27, 2016 (JP) .............................. JP2016-089473
(Continued)

(51) Int. Cl.
*C22B 5/10*     (2006.01)
*C22B 1/242*    (2006.01)
(Continued)

(52) U.S. Cl.
CPC ................ *C22B 5/10* (2013.01); *C21B 13/08* (2013.01); *C22B 1/242* (2013.01); *C22B 1/2406* (2013.01);
(Continued)

(58) Field of Classification Search
CPC ......... C22B 5/10; C22B 23/02; C22B 23/021; C22B 23/023; C22B 1/14; C22B 13/08;
(Continued)

(56) References Cited

U.S. PATENT DOCUMENTS 2,111,344 A * 3/1938 Weitzenkorn ........... C22B 1/248
75/304
4,588,438 A * 5/1986 Fujishige ................. C22B 21/02
420/77
(Continued)

FOREIGN PATENT DOCUMENTS

CA    2956509 A1    2/2016
CN    1294281 C     1/2007
(Continued)

OTHER PUBLICATIONS

Emi Murakawa et al., Charging Method for Raw Material in Blast Furnace, Jun. 17, 1988, English Translation of JP-63145704-A (Year: 1988).*
(Continued)

*Primary Examiner* — Jie Yang
(74) *Attorney, Agent, or Firm* — Locke Lord LLP; James E. Armstrong, IV; Nicholas J. DiCeglie, Jr.

(57) ABSTRACT

The present invention addresses the problem, in methods for producing a metal or alloy by reducing a mixture that contains an oxide ore, of providing an oxide ore smelting method with good productivity and efficiency. The present invention is an oxide ore smelting method for producing a metal or alloy by reducing a mixture that contains an oxide
(Continued)

ore, the method comprising at least: a mixing step S1 for mixing an oxide ore with a carbonaceous reducing agent; a mixture-molding step S2 for molding the mixture obtained to obtain a mixture-molded body; and a reducing step S3 for heating the mixture-molded body obtained at a specified reducing temperature in a reducing furnace.

14 Claims, 18 Drawing Sheets

(30) Foreign Application Priority Data

| Mar. 9, 2017 | (JP) | JP2017-045458 |
|---|---|---|
| Mar. 9, 2017 | (JP) | JP2017-045459 |
| Mar. 9, 2017 | (JP) | JP2017-045460 |
| Mar. 9, 2017 | (JP) | JP2017-045463 |
| Mar. 9, 2017 | (JP) | JP2017-045469 |

(51) Int. Cl.
*C22B 23/02* (2006.01)
*C21B 13/08* (2006.01)
*C22B 1/24* (2006.01)
*C22C 38/08* (2006.01)

(52) U.S. Cl.
CPC ............ *C22B 23/02* (2013.01); *C22B 23/021* (2013.01); *C22B 23/023* (2013.01); *C22C 38/08* (2013.01); *C22C 2202/02* (2013.01)

(58) Field of Classification Search
CPC ....... C22B 1/2406; C22B 1/242; C22B 1/245; C21B 13/006; C21B 13/105; C22C 38/08; C22C 2202/02
USPC .......................................................... 75/629
See application file for complete search history.

(56) References Cited

U.S. PATENT DOCUMENTS

| 6,129,777 | A | 10/2000 | Fuji et al. | |
| 8,333,823 | B2 | 12/2012 | Iwasaki et al. | |
| 8,372,179 | B2* | 2/2013 | Barnes | C21B 13/105 |
| | | | | 75/435 |
| 9,970,085 | B2 | 5/2018 | Takahashi et al. | |
| 2001/0037703 | A1* | 11/2001 | Fuji | C21B 13/105 |
| | | | | 75/483 |
| 2003/0037485 | A1 | 2/2003 | Carnegie et al. | |
| 2005/0211020 | A1 | 9/2005 | Sugitatsu et al. | |
| 2007/0113708 | A1 | 5/2007 | Sugitatsu et al. | |
| 2009/0249921 | A1 | 10/2009 | Osborne et al. | |
| 2013/0074654 | A1 | 3/2013 | Ito | |
| 2013/0111809 | A1 | 5/2013 | Kamikawa et al. | |
| 2016/0237514 | A1 | 8/2016 | Ito et al. | |
| 2017/0152585 | A1 | 6/2017 | Takahashi et al. | |
| 2017/0204496 | A1 | 7/2017 | Takahashi et al. | |
| 2017/0211166 | A1 | 7/2017 | Takahashi et al. | |
| 2017/0306444 | A1 | 10/2017 | Takahashi et al. | |
| 2019/0119779 | A1 | 4/2019 | Iseki et al. | |
| 2019/0144971 | A1* | 5/2019 | Iseki | C22B 1/245 |
| | | | | 75/629 |

FOREIGN PATENT DOCUMENTS

| CN | 101037713 | A | | 9/2007 | |
| CN | 101392330 | A | | 3/2009 | |
| CN | 101748298 | B | | 10/2012 | |
| CN | 104404246 | A | | 3/2015 | |
| EP | 1426451 | A1 | | 6/2004 | |
| EP | 1749894 | A1 | | 2/2007 | |
| EP | 2325341 | A1 | | 5/2011 | |
| EP | 2876174 | A1 | | 5/2015 | |
| EP | 3162904 | A1 | | 5/2017 | |
| GB | 1569311 | A | * | 6/1980 | ............. C21B 13/08 |
| GN | 104313227 | A | | 1/2015 | |
| JP | 63145704 | A | * | 6/1988 | ............... C21B 5/00 |
| JP | H01-162729 | A | | 6/1989 | |
| JP | H03-047927 | A | | 2/1991 | |
| JP | H04-210432 | A | | 7/1992 | |
| JP | 07-286205 | A | | 10/1995 | |
| JP | 10-030106 | A | | 2/1998 | |
| JP | 11-092810 | A | | 4/1999 | |
| JP | 2001-098313 | A | | 4/2001 | |
| JP | 2001181719 | A | * | 7/2001 | ........... C21B 13/105 |
| JP | 2001-294921 | A | | 10/2001 | |
| JP | 2002-241822 | A | | 8/2002 | |
| JP | 2003-089812 | A | | 3/2003 | |
| JP | 2004-156140 | A | | 6/2004 | |
| JP | 2005-194544 | A | | 7/2005 | |
| JP | 2005-220398 | A | | 8/2005 | |
| JP | 2005-314745 | A | | 11/2005 | |
| JP | 2006-124793 | A | | 5/2006 | |
| JP | 2006-265569 | A | | 10/2006 | |
| JP | 2007-231418 | A | | 9/2007 | |
| JP | 2011-256414 | A | | 12/2011 | |
| JP | 2012-017526 | A | | 1/2012 | |
| JP | 2016-030835 | A | | 3/2016 | |
| JP | 2017-052993 | A | | 3/2017 | |
| WO | 2015/045670 | A1 | | 4/2015 | |
| WO | 2016/013355 | A1 | | 1/2016 | |
| WO | 2016/017347 | A1 | | 2/2016 | |
| WO | 2016017348 | A1 | | 2/2016 | |
| WO | 2016/056362 | A1 | | 4/2016 | |

OTHER PUBLICATIONS

Office Action dated Jul. 23, 2019, issued in the CN Patent Application No. CN201780022977.5.
Extended European Search Report dated Feb. 19, 2020, issued in the EP Patent Application No. EP17789626.3.
Notification of Reasons for Refusal dated Mar. 17, 2020, issued in the JP Patent Application No. 2016-089469.
Othmer K Ed—Mark H F et al., "Encyclopedia of Chemical Technology Third Edition, vol. 21". Passage Text, Jan. 1, 1978, Kirk—Othmer Encyclopedia of Chemical Technology. Silver and Silver Alloys to Sulfolanes and Sulfones, New York, Wiley & Sons, US, pp. 77-105, XP002054080. (cited in the Nov. 4, 2019 Search Report issued for EP17789626.3).
Partial Supplementary European Search Report dated Nov. 4, 2019, issued in the EP Patent Application No. 17789626.3.
Office Action dated Nov. 26, 2019, issued in the CA Patent Application No. CA3021829.
International Search Report dated Jul. 11, 2017, issued for PCT/JP2017/016620.
Office Action issued in AU Patent Application No. AU 2020203208, dated Jan. 8, 2021.
Extended European Search Report dated Oct. 6, 2020, issued in the EP Patent Application No. 20196074.7.
Extended European Search Report dated Oct. 16, 2020, issued in the EP Patent Application No. 20197015.9.
Office Action issued in the AU Patent Application No. 2020203209, dated Jan. 22, 2021.
Hideki Tomiyama : Kneading simulation of the extrusion molding machine, Japan Society of Rubber, Japan, Society of Rubber, Japan, Dec. 31, 2016 ; vol. 89, No. 12, p. 368-374.
Shin Hotani et al., Continuous kneader for polyolefin, and 2 shaft extruder, Kobe Steel Research, Japan, Kobe Steel, Ltd., Jan. 30, 2008, vol. 58, No. 2, p. 74-80.
Decision of Refusal issued in the JP Patent Application No. 2017-045469, dated Sep. 7, 2021.
Office Action issued in the U.S. Appl. No. 16/093,339, dated May 16, 2022.
Extended European Search Report issued in the EP Patent Application No. EP20197570.3, dated Oct. 20, 2020.
Extended European Search Report issued in the EP Patent Application No. EP20197857.4, dated Oct. 20, 2020.

(56) References Cited

OTHER PUBLICATIONS

Iron Alloy Process Technology, edited by Wei Dai and Shuri, pp. 66-70, Beijing: Metallurgical Industry Publishing Company, Jun. 2015.
Decision of Refusal issued in the CN Patent Application No. CN201780022808.1, dated Nov. 3, 2020.
Extended European Search Report issued in the EP Patent Application No. EP17786003.8, dated Feb. 14, 2020.
Partial Supplementary European Search Report issued in the EP Patent Application No. EP17786003.8, dated Nov. 4, 2019.
Office Action issued in the CN Patent Application No. CN201780022808.1, dated Jul. 23, 2019.
International Search Report issued for International Application No. PCT/JP2017/015776 dated May 30, 2017.

* cited by examiner

OXIDE ORE SMELTING METHOD

TECHNICAL FIELD

The present invention relates to an oxide ore smelting method in which a pellet or the like is molded from a mixture of an oxide ore, for example, nickel oxide ore containing nickel oxide and iron oxide, and a reducing agent and smelted by being reduced and heated in a smelting furnace (reducing furnace).

BACKGROUND ART

As a method for smelting nickel oxide ore which is one kind of metal oxide ore and called limonite or saprolite, a dry smelting method in which nickel mat is produced by sulfurizing and roasting nickel oxide ore with sulfur by using an smelting furnace, a dry smelting method in which ferronickel, which is an alloy of iron and nickel, is produced by reducing nickel oxide ore with a carbonaceous reducing agent by using a rotary kiln or a movable hearth furnace, a wet smelting method in which a mixed sulfide (mixed sulfide) is produced by adding a sulfurizing agent to a leachate obtained by leaching nickel and cobalt from nickel oxide ore with sulfuric acid by using an autoclave, and the like are known.

A pretreatment for forming the raw material ore into a lump molding is performed in order to advance the reaction in a case in which nickel oxide ore is smelted by being reduced with a carbon source among the various smelting methods described above. Specifically, when nickel oxide ore is formed into a lump product, that is, a lump is formed from a powdery or granular material, it is general that the nickel oxide ore is mixed with a binder, a reducing agent and the like and the mixture is further subjected to moisture adjustment and the like, then charged into a lump product manufacturing machine, and formed into a lump molding (indicating a pellet, a briquette, or the like. Hereinafter simply referred to as the "pellet") in, for example, about 10 mm to 30 mm.

This pellet is required to exhibit gas permeability to a certain extent, for example, in order to emit moisture. Furthermore, the composition is nonuniform and the metal is dispersed or unevenly distributed when the reduction reaction does not uniformly proceed in the pellet, and it is thus important that the shape is maintained even when the pellet is charged into the smelting furnace and the smelting operation such as reduction and heating is started.

Moreover, it is particularly important that a shell-shaped metal (metal shell) to be generated from a metal component is generated on the pellet surface at the initial stage of reduction. The reducing agent component (for example, carbon monoxide in the case of a carbonaceous reducing agent) in the pellet leaks when a uniform metal shell is not effectively generated on the surface of the pellet, and not only the pellet cannot be efficiently reduced but also control of the rate of reduction is difficult. In addition, partial variations in the composition are also great, and as a result, it is impossible to produce the intended ferronickel.

The shape, strength and the like of pellets of the raw material mixture are significantly important in order to generate such a uniform metal shell. In other words, local metalation on the pellet surface proceeds when the shape is distorted, and a uniform metal shell is not generated. In addition, there is a case in which cracks are generated when the pellet is moved to the next step after molding and at the time of drying, reduction and the like and breaking is also caused when the strength of the pellet is weak.

In this manner, the shape, strength and the like of pellets are significantly important factors in order to generate a uniform metal shell on the surface of pellet. In addition, a technique is demanded which not only generates a metal shell but also is highly productive and efficiently performing lumping in the metal smelting in stiff cost competition.

For example, Patent Document 1 discloses a technique for producing a pellet by adjusting the excess carbon amount in the mixture in a mixing step for mixing raw materials including nickel oxide and iron oxide with a carbonaceous reducing agent to obtain a mixture, charging the pellet into a furnace, and performing a reducing step as a pretreatment method when producing ferronickel by utilizing a movable hearth furnace.

Specifically, it is described in Patent Document 1 that raw materials and a carbonaceous reducing agent may be mixed together by using a mixing machine and the mixture obtained may be charged into a movable hearth furnace as it is, but it is preferable to agglomerate the mixture by using a granulating machine, and the amount of dust generated decreases, the heat transfer efficiency inside the agglomerated product (mixture) in the movable hearth furnace is improved, and the reduction rate increases by performing agglomeration. Incidentally, it is described that an extrusion molding machine can be used as a granulating machine to be used for agglomeration in addition to a compression molding machine such as a briquette press or a tumbling granulator such as a disk type pelletizer.

However, upon lumping (agglomeration), it is difficult to efficiently perform the lumping treatment while maintaining high productivity only by using a general compression molding machine or tumbling granulator in the case of lumping required for generating a metal shell.

In addition, in Patent Document 1, it is described that a mixture may be charged into a movable hearth furnace as it is but the specific method thereof is not described, and it is considered that the metal shell is not uniformly and stably formed and the reduction also ununiformly proceeds when the mixture is only charged into a movable hearth furnace.

In addition, the running cost is required and the treatment time is also required even if any apparatus is used in order to agglomerate the mixture. In addition, there is a possibility that loss occurs, the agglomerated product is broken during moving and treatment, cracks are generated, and a decrease in yield is led. Furthermore, the ferronickel to be obtained is also small when the agglomerated product has a size of about from several mm to several centimeters, it is difficult to recover the metal, and as a result, a decrease in yield is led.

In addition, it is important to maintain the temperature as constant as possible when reducing the pellets.

In addition, it is also a significantly important technique to coarsen the ferronickel generated by reduction. This is because it is difficult to separate the ferronickel from the slag which have been generated at the same time and the recovery rate (yield) as ferronickel greatly decreases in a case in which the ferronickel generated has a fine size of, for example, from several tens of micrometers to several hundreds of micrometers or less. For this reason, a treatment for coarsening ferronickel after being reduced is required.

In addition, it is also an important technical matter how the smelting cost can be suppressed low, and a continuous treatment that can be operated in a compact facility is desired.

For example, Patent Document 2 discloses a method for producing a granular metal, which includes supplying an agglomerated product containing a metal oxide and a carbonaceous reducing agent onto a hearth of a moving bed type reduction melting furnace and heating the agglomerated product to reduce and melt the metal oxide and in which an agglomerated product having an average diameter of 19.5 mm or more and 32 mm or less is supplied onto the hearth so as to have a base density of 0.5 or more and 0.8 or less and heated where the base density denotes the relative value of the projected area ratio of the agglomerated product onto the hearth with respect to the largest projected area ratio of the agglomerated product onto the hearth when the distance between the agglomerated products is taken as 0. In this method, it is described that the productivity of granular metal iron is enhanced as the base density of agglomerated product and the average diameter are controlled concurrently.

However, the method disclosed in Patent Document 2 is a technique for controlling the reaction which takes place outside the agglomerated product, and the attention is not paid to the control of the reaction which takes place inside the agglomerated product and is the most important factor in the reduction reaction. On the other hand, it has been demanded to obtain a higher quality metal (metal, alloy) by controlling the reaction taking place inside the agglomerated product, thus increasing the reaction efficiency, and more uniformly advancing the reduction reaction.

In addition, as described in Patent Document 2, the yield when fabricating the agglomerated product is low in the method using one having a specific diameter as an agglomerated product since it is required to remove one that does not have the specific diameter. In addition, the method disclosed in Patent Document 2 is a method exhibiting low productivity since it is required to adjust the base density of agglomerated product to 0.5 or more and 0.8 or less and it is also impossible to laminate the agglomerated product. For these reasons, the method disclosed in Patent Document 2 requires high manufacturing cost.

As a further significant problem, there is a significant problem in terms of operation cost in the process using the so-called total melting method in which all the raw materials are melted and reduced as described in Patent Document 2.

For example, a high temperature of 1500° C. or more is required in order to completely melt the nickel oxide ore described above. Large energy cost is required in order to obtain such a high temperature, and there is a problem that repair cost is also required since the furnace used at such a high temperature is likely to be damaged.

In addition, it is extremely inefficient to completely melt nickel oxide ore to be a raw material since the nickel oxide ore contains the intended nickel at only about 1% and all the components including components which are not required to be recovered are melted even though it is not required to recover components other than iron corresponding to nickel.

Hence, reduction methods by partial melting have been investigated, in which only required nickel is reduced and iron contained in a much greater amount than nickel is only partially reduced. However, in such a partial reduction method (or also referred to as a nickel preferential reduction method), the reduction reaction is performed while maintaining the raw materials in a semi-solid state in which the raw materials are not completely melted and thus it is not easy to control the reaction so that the reduction of iron is kept in the range corresponding to that of nickel while completely reducing 100% of nickel. For this reason, there is a problem that partial variations in the reduction in the raw material are likely to occur, the recovery rate of nickel decreases, and, it is thus difficult to perform an efficient operation.

As described above, the technique for producing a metal and an alloy by mixing and reducing an oxide ore has a number of problems from the viewpoint of enhancing the productivity and efficiency, diminishing the manufacturing cost, and increasing the quality of metal.

Patent Document 1: Japanese Unexamined Patent Application, Publication No. 2004-156140

Patent Document 2: Japanese Unexamined Patent Application, Publication No. 2011-256414

DISCLOSURE OF THE INVENTION

Problems to be Solved by the Invention

The present invention has been proposed in view of such circumstances, and an object thereof is to provide a method exhibiting favorable productivity and efficiency in a method for producing a metal or an alloy by reducing a mixture containing an oxide ore and a carbonaceous reducing agent.

Means for Solving the Problems

The inventors of the present invention have conducted intensive investigations to solve the above-mentioned problems. As a result, it has been found out that a metal and an alloy exhibiting high efficiency in reduction reaction can be produced by mixing at least an oxide ore and a carbonaceous reducing agent and kneading the mixture obtained or forming the mixture into a mixture-molded body, whereby the present invention has been achieved. In other words, the present invention provides the following.

(1) A first aspect of the present invention is an oxide ore smelting method for producing a metal or an alloy by reducing a mixture containing an oxide ore, the method including a mixing treatment step for mixing at least the oxide ore and a carbonaceous reducing agent, a mixture-molding step for molding the mixture obtained to obtain a mixture-molded body, and a reducing step for heating the mixture-molded body obtained at a predetermined reducing temperature in a reducing furnace.

(2) A second aspect of the present invention is the oxide ore smelting method according to the first aspect, in which the mixture is molded into a rod shape or a cylindrical shape and the mixture obtained by molding is cut into a flat plate-shaped or disk-shaped pellet in the mixture-molding step.

(3) A third aspect of the present invention is the oxide ore smelting method according to the second invention, in which a movable hearth furnace is used as the reducing furnace and the flat plate-shaped or disk-shaped pellet is charged into the movable hearth furnace and reduced and heated in the reducing step.

(4) A fourth aspect of the present invention is the oxide ore smelting method according to the first aspect, in which a pellet is formed as a mixture-molded body in the mixture-molding step and the pellet is laminated to form a pellet laminate and the pellet laminate is charged into the reducing furnace and subjected to the heating in the reducing step.

(5) A fifth aspect of the present invention is the oxide ore smelting method according to the fourth aspect, in which the mixture is molded into a cubic shape, a rectangular parallelepiped shape or a cylindrical shape in the mixture-molding step.

(6) A sixth aspect of the present invention is the oxide ore smelting method according to the fourth or fifth aspect, in which the mixture is molded into a volume of 8000 mm$^3$ or more in the mixture-molding step.

(7) A seventh aspect of the present invention is the oxide ore smelting method according to any one of the fourth to sixth aspects, in which a movable hearth furnace is used as the reducing furnace and a pellet laminate is charged into a hearth of the movable hearth furnace and subjected to the heating in the reducing step.

(8) An eighth aspect of the present invention is the oxide ore smelting method according to the first aspect, in which the mixture-molded body molded so as to have a thickness of 17 mm or more is charged into the reducing furnace and subjected to heating in the reducing step.

(9) A ninth aspect of the present invention is the oxide ore smelting method according to the eighth aspect, in which a pellet having a thickness of 17 mm or more is obtained as the mixture-molded body in the mixture-molding step.

(10) A tenth aspect of the present invention is the oxide ore smelting method according to the first aspect, in which the mixture-molded body molded so as to have a shortest length from center to a surface of the mixture-molded body of 10 mm or more is charged into the reducing furnace and subjected to the heating in the reducing step.

(11) An eleventh aspect of the present invention is the oxide ore smelting method according to the tenth aspect, in which a pellet having a shortest length from center to a surface of 10 mm or more is obtained as the mixture-molded body in the mixture-molding step.

(12) A twelfth aspect of the present invention is the oxide ore smelting method according to the first aspect, in which the mixture is molded into a thickness corresponding to temperature distribution in the reducing furnace in the mixture-molding step and the mixture-molded body having an adjusted thickness is charged into a place corresponding to temperature distribution in the reducing furnace and subjected to the heating in the reducing step.

(13) A thirteenth aspect of the present invention is the oxide ore smelting method according to the twelfth aspect, in which temperature distribution in the reducing furnace is measured by heating the empty reducing furnace at the reducing temperature prior to heating of the mixture-molded body in the reducing step.

(14) A fourteenth aspect of the present invention is the oxide ore smelting method according to the twelfth or thirteenth aspect, in which a pellet is molded as the mixture-molded body in the mixture-molding step.

(15) A fifteenth aspect of the present invention is the oxide ore smelting method according to the fourteenth aspect, in which the pellet having a thickest thickness is charged into a place at which a temperature is highest in temperature distribution in the reducing furnace in the reducing step.

(16) A sixteenth aspect of the present invention is the oxide ore smelting method according to any one of the twelfth to fifteenth aspects, in which the mixture-molded body adjusted so that a thickness of the mixture-molded body decreases in a range of 0.20% or more and 0.80% or less every time a temperature in the temperature distribution decreases by 1.0° C. when a thickness of the mixture-molded body to be charged into a place at which a temperature is highest in temperature distribution in the reducing furnace is taken as 100% is charged into the reducing furnace in the reducing step.

(17) A seventeenth aspect of the present invention is the oxide ore smelting method according to the first aspect, in which the mixture is molded by being filled into a predetermined container and a mixture-filled container is obtained as the mixture-molded body in the mixture-molding step.

(18) An eighteenth aspect of the present invention is the oxide ore smelting method according to the seventeenth aspect, in which the mixture-filled container is heated in a state of having a lid on the mixture-filled container in the reducing step.

(19) A nineteenth aspect of the present invention is the oxide ore smelting method according to the seventeenth or eighteenth aspect, in which the container has a rectangular parallelepiped shape or a cubic shape.

(20) A twentieth aspect of the present invention is the oxide ore smelting method according to any one of the seventeenth to nineteenth aspects, in which a movable hearth furnace is used as the reducing furnace and the mixture-filled container is charged into the movable hearth furnace and reduced and heated in the reducing step.

(21) A twenty-first aspect of the present invention is the oxide ore smelting method according to the first aspect, in which the oxide ore and the carbonaceous reducing agent are mixed and kneaded in the mixing treatment step.

(22) A twenty-second aspect of the present is the oxide ore smelting method according to the twenty-first aspect, in which the oxide ore is reduced without generating a crust including the metal or the alloy on a surface of the mixture in the reducing step.

(23) A twenty-third aspect of the present invention is the oxide ore smelting method according to any one of the first to twenty-second aspects, in which the reducing temperature in the reducing step is 1250° C. or more and 1450° C. or less.

(24) A twenty-fourth aspect of the present invention is the oxide ore smelting method according to any one of the first to twenty-third aspects, which further includes a separating step for separating slag and obtaining a metal or an alloy after the reducing step is performed.

(25) A twenty-fifth aspect of the present invention is the oxide ore smelting method according to any one of the first to twenty-fourth aspects, in which the oxide ore is nickel oxide ore.

(26) A twenty-sixth aspect of the present invention is the oxide ore smelting method according to the twenty-fifth aspect, in which ferronickel is obtained as the alloy.

Effects of the Invention

According to the present invention, it is possible to provide a method exhibiting favorable productivity and efficiency in a method for producing a metal or an alloy from a mixture containing an oxide ore and a carbonaceous reducing agent.

PREFERRED MODE FOR CARRYING OUT THE INVENTION

Hereinafter, specific embodiments of the present invention (hereinafter referred to as the "present embodiments") will be described in detail. It should be noted that the present invention is not limited to the following embodiments, and various modifications can be made without changing the gist of the present invention. In addition, in the present specification, the notation "X to Y" (X and Y are arbitrary numerical values) means "X or more and Y or less".

In the present specification, the term "pellet" means a lump molding (a pellet, a briquette, or the like) produced from a mixture of an oxide ore and a carbonaceous reducing agent. Moreover, the shape of the pellet is not limited, and it may be a cubic, rectangular parallelepiped, cylindrical or spherical shape.

<<Oxide Ore Smelting Method>>

An oxide ore smelting method according to the present invention is an oxide ore smelting method for producing a metal or an alloy by heating and reducing a mixture containing an oxide ore, which includes a mixing treatment step for mixing at least the oxide ore and a carbonaceous reducing agent, a mixture-molding step for molding the mixture obtained to obtain a mixture-molded body, and a reducing step for heating the mixture-molded body at a predetermined reducing temperature in a reducing furnace.

Figure 1:
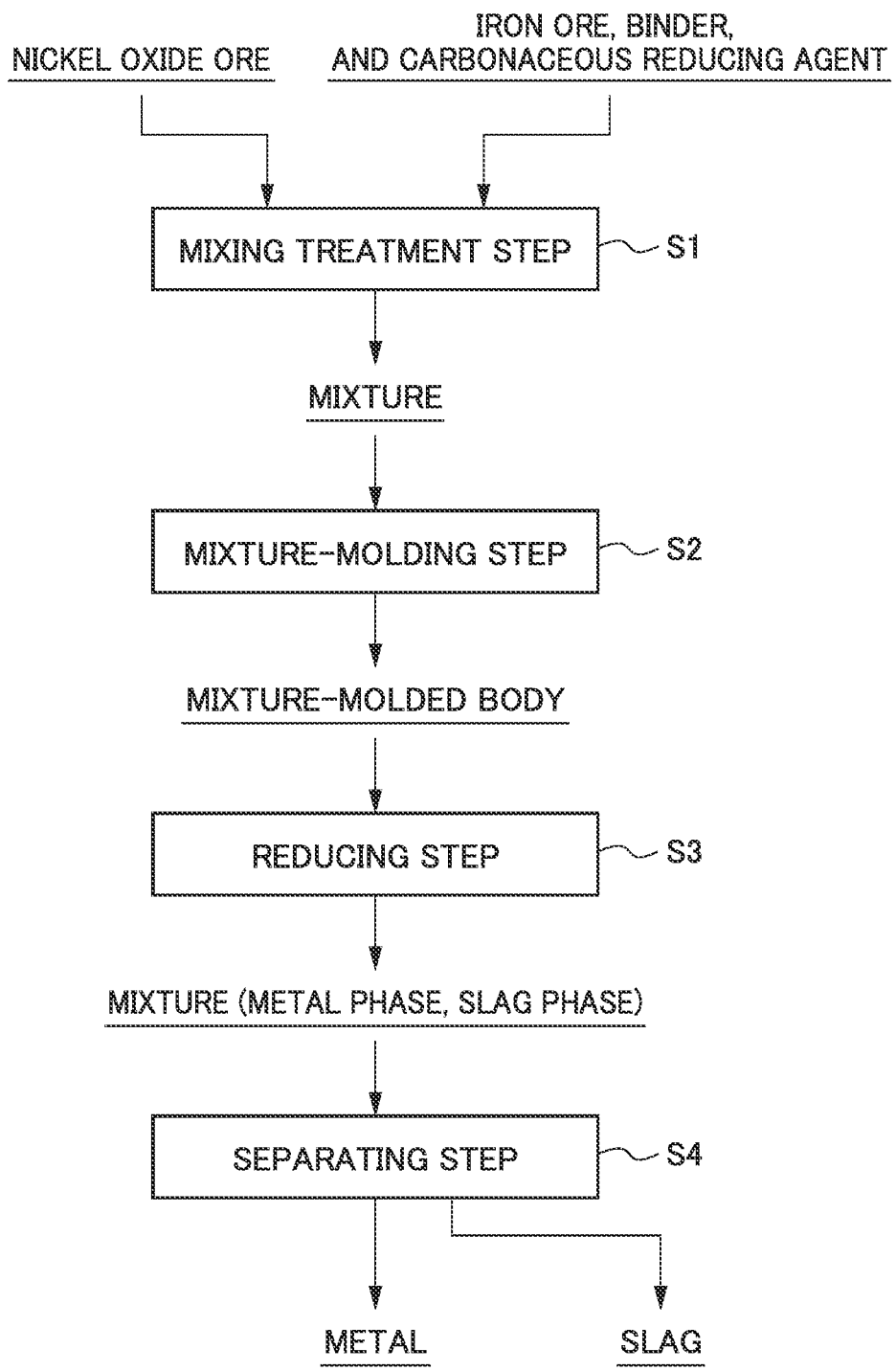
FIG. 1 is a flowchart illustrating an example of the flow of an oxide ore smelting method.

FIG. 1 is a flowchart illustrating an example of the flow of the oxide ore smelting method. As illustrated in FIG. 1, the oxide ore smelting method according to the present invention includes a mixing treatment step S1 for mixing raw materials including an oxide ore, a mixture-molding step S2 for molding the mixture obtained into a predetermined shape to obtain a mixture-molded body, a reducing step S3 for heating the mixture-molded body obtained at a predetermined reducing temperature in a reducing furnace, and a separating step S4 for separating the metal and slag generated in the reducing step S3 from each other and recovering the metal.

Hereinafter, a smelting method for producing ferronickel by forming a mixture-molded body from nickel oxide ore, which is an oxide ore to be a raw material ore, preferentially reducing nickel (nickel oxide) in the mixture-molded body and partially reducing iron (iron oxide) to generate a metal (reduced metal) of an iron-nickel alloy, and further separating the metal will be described as an example. Incidentally, the smelting method of an oxide ore composed of another metal oxide can also be considered in the same manner.

1. First Embodiment

In the oxide ore smelting method according to the first embodiment, a pellet, which is a mixture-molded body, is formed from a mixture of raw materials including an oxide ore, which is a raw material ore, and the pellet is charged into a smelting furnace (reducing furnace) and subjected to a reduction treatment to generate a metal and slag. More specifically, a mixture obtained by mixing nickel oxide ore and a carbonaceous reducing agent is molded into a rod shape or a cylindrical shape and the molded product obtained by molding is cut into a flat plate-shaped or disk-shaped pellet.

[1-1. Mixing Treatment Step]

The mixing treatment step S1 is a step for mixing a raw material powder containing nickel oxide ore with other raw materials to obtain a mixture. Specifically, in the mixing treatment step S1, a carbonaceous reducing agent is added together with nickel oxide ore, which is a raw material ore, powders of iron ore, a flux component, a binder, and the like having a particle diameter of, for example, about from 0.2 mm to 0.8 mm as additives of arbitrary components are added, and these are mixed together to obtain a mixture. Here, mixing of the raw material powder containing nickel oxide ore can be performed by using a mixing machine or the like.

The nickel oxide ore, which is a raw material ore, is not particularly limited, but limonite ore, saprolite ore and the like can be used. Incidentally, this nickel oxide ore contains nickel oxide (NiO) and iron oxide ($Fe_2O_3$) as constituents.

In the present embodiment, a specific amount of a carbonaceous reducing agent is mixed with the raw material ore to obtain a mixture. The carbonaceous reducing agent is not particularly limited, but examples thereof may include a coal powder and a coke powder. Incidentally, it is preferable that this carbonaceous reducing agent is equivalent to the nickel oxide ore, which is a raw material ore, described above in the particle size and particle size distribution. It is preferable that the particle size and particle size distribution of the carbonaceous reducing agent are equivalent to those of the nickel oxide ore since these materials are likely to be uniformly mixed and the reduction reaction also uniformly takes place.

The amount of the carbonaceous reducing agent mixed, namely, the amount of the carbonaceous reducing agent to be present in the mixture-molded body after molding is preferably an amount in which a greater amount of nickel oxide constituting the nickel oxide ore is reduced and iron oxide is partially reduced. More specifically, it is preferable to set the amount of the carbonaceous reducing agent mixed to a proportion of 60.0% or less, it is more preferable to set the amount to a proportion of 50.0% or less, it is still more preferable to set the amount to a proportion of 40.0% or less, and it is still more preferable to set the amount to a proportion of 35.0% or less when the amount of carbonaceous reducing agent required for reducing nickel oxide contained in the nickel oxide ore and iron oxide without excess or deficiency is taken as 100%. On the other hand, it is not preferable that the amount of carbon exceeds 60.0% since a quality problem arises, for example, the reduction reaction proceeds too much, the amount of iron reduced increases, and the nickel grade in the iron-nickel alloy decreases.

It is preferable in terms of productivity and quality that the carbonaceous reducing agent is contained in the mixture so that the amount of the carbonaceous reducing agent (the amount of the carbonaceous reducing agent mixed) present in the mixture-molded body after molding is a proportion of 60.0% or less when the total value of chemical equivalents is taken as 100% in this manner since it is possible to more effectively and uniformly generate a crust (metal shell) generated by a metal component on the surface of the mixture-molded body by the reduction and heat treatment. In addition, there is a case in which the nickel grade in the iron-nickel alloy decreases when the reduction reaction proceeds too much and the amount of iron generated increases, but it is possible to suppress a decrease in the nickel grade by setting the amount of the carbonaceous reducing agent contained in the mixture-molded body to 60.0% or less.

The lower limit value of the amount of the carbonaceous reducing agent mixed is not particularly limited, but it is preferable to set the amount to a proportion of 5.0% or more, it is more preferable to set the amount to a proportion of 8.0% or more, it is still more preferable to set the amount to a proportion of 10.0% or more, it is still more preferable to set the amount to a proportion of 12.0% or more, and it is still more preferable to set the amount to a proportion of 15.0% or more when the total value of chemical equivalents is taken as 100%. It is easy to produce an iron-nickel alloy having a high nickel grade by setting the amount of the carbonaceous reducing agent mixed to 5.0% or more in this manner. On the other hand, the reduction of nickel is insufficient and the productivity deteriorates when the amount of the carbonaceous reducing agent mixed is not set to 5.0% or more.

Incidentally, the amount of the carbonaceous reducing agent required for reducing nickel oxide and iron oxide without excess or deficiency can be expressed in another word of the total value (hereinafter also referred to as the "total value of chemical equivalents") of a chemical equivalent required for reducing the entire amount of nickel oxide contained in the mixture-molded body to be formed into nickel metal and a chemical equivalent required for reducing iron oxide contained in the mixture-molded body into iron metal.

In addition to the nickel oxide ore and the carbonaceous reducing agent, iron ore which is an additive to be added as an arbitrary component in order to adjust the iron-nickel ratio in the mixture is not particularly limited, but for example, one having an iron grade of about 50% or more, hematite obtained by wet smelting of nickel oxide ore, and the like can be used.

In addition, examples of the binder may include bentonite, a polysaccharide, a resin, water glass, and dehydrated cake. In addition, examples of the flux component may include calcium oxide, calcium hydroxide, calcium carbonate, and silicon dioxide.

An example of the composition (% by weight) of a part of raw material powders to be mixed in the mixing treatment step S1 are presented in the following Table 1. Incidentally, the composition of raw material powders is not limited to this.

TABLE 1

| Raw material powder [% by weight] | Ni | $Fe_2O_3$ | C |
|---|---|---|---|
| Nickel oxide ore | 1~2 | 50~60 | — |
| Carbonaceous reducing agent | — | — | ≈85 |
| Iron ore | — | 80~95 | — |

[1-2. Mixture-Molding Step]

The mixture-molding step S2 is a step for molding the mixture of raw material powders obtained in the mixing treatment step S1 and drying the molded mixture if necessary to obtain a mixture-molded body.

Figure 2:
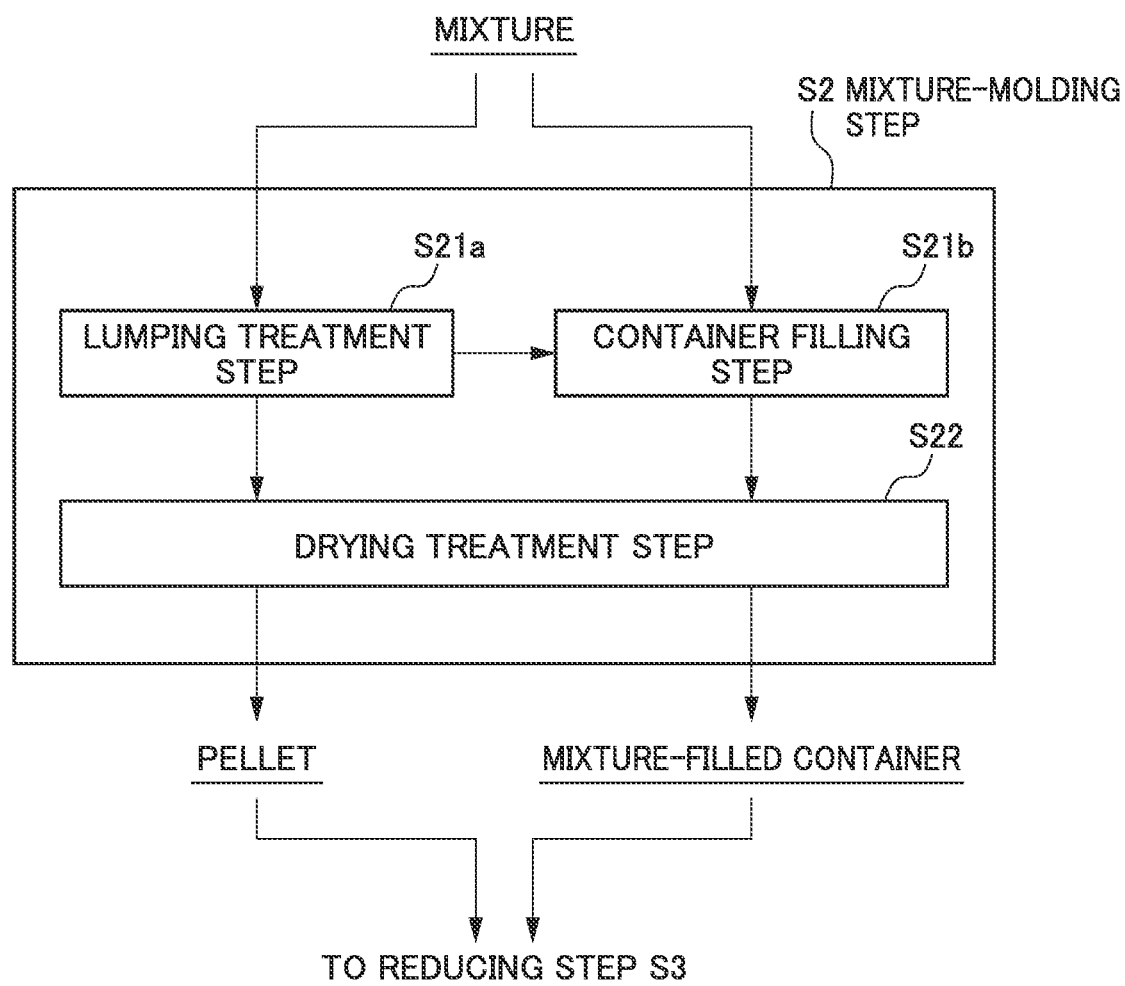
FIG. 2 is a treatment flowchart illustrating an example of the flow of treatments in a mixture-molding step.

FIG. 2 is a treatment flowchart illustrating the flow of treatments in the mixture-molding step S2. As illustrated in FIG. 2, the mixture-molding step S2 is briefly divided into a lumping treatment step S21a for lumping (granulating) a mixture of raw materials including an oxide ore to obtain a pellet and a container filling step S21b for filling a mixture of raw materials including an oxide ore or a molding thereof into a predetermined container for reduction to obtain a mixture-filled container, and the mixture-molding step S2 includes the lumping treatment step S21a between these in the present embodiment. Here, in the present embodiment, the mixture-molding step S2 may include an arbitrary drying treatment step S22 for drying the mixture after the lumping treatment step S21a.

(1) Lumping Treatment Step

The lumping treatment step S21a is a step for lumping (granulating) the mixture of raw material powders obtained in the mixing treatment step S1 to obtain a lump molding (hereinafter simply referred to as the "pellet") having a predetermined shape and a predetermined size, such as a pellet and a briquette as the mixture-molded body.

Figure 3:
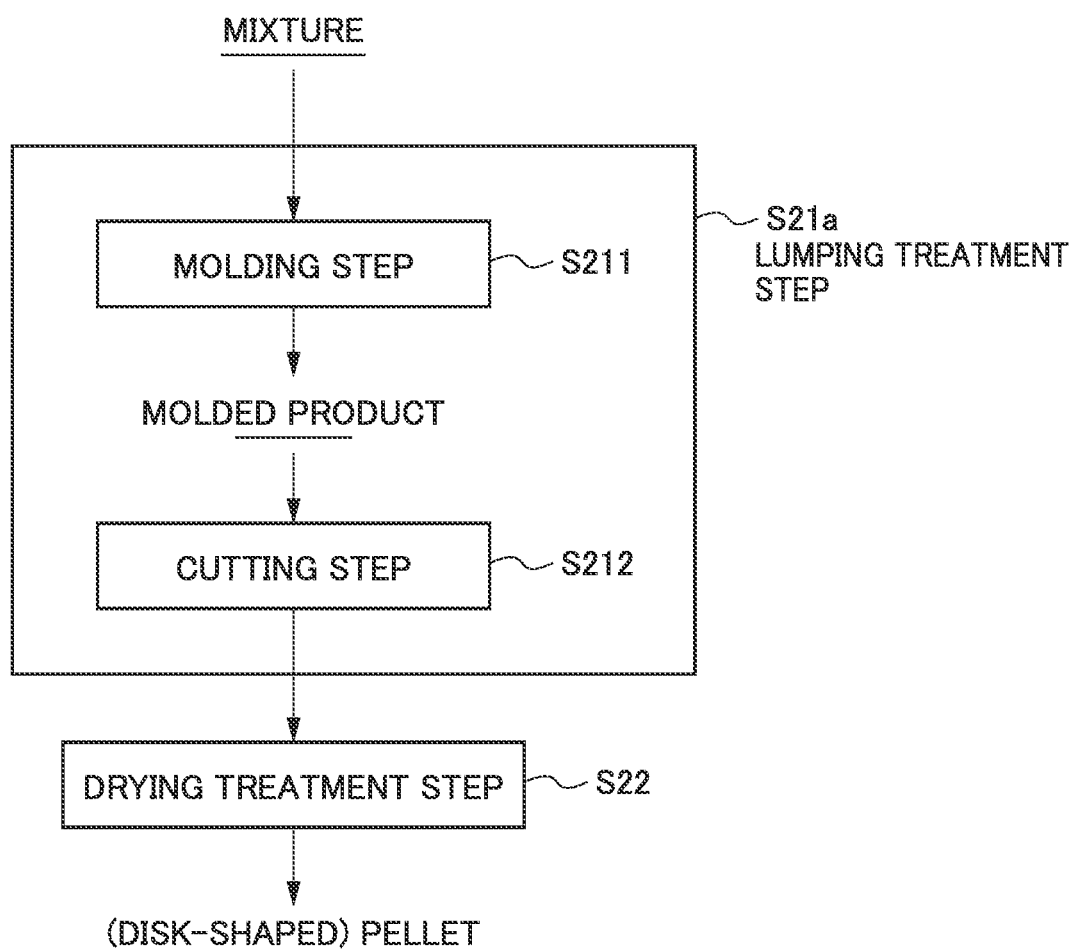
FIG. 3 is a treatment flowchart illustrating the flow of treatments in a lumping treatment step.

FIG. 3 is a treatment flowchart illustrating the flow of treatments in the lumping treatment step S21a. As illustrated in FIG. 3, the lumping treatment step S21a includes a molding step S211 for molding a mixture of raw material powders into a rod shape or a cylindrical shape and a cutting step S212 for cutting the mixture obtained by molding into a flat plate shape or a disk shape to obtain a pellet. The mixture-molding step S2 may include an arbitrary drying treatment step S22 for drying the mixture after this lumping treatment step S21a.

As described above, in the present embodiment, the mixture of the raw material powders is molded into a rod shape or a cylindrical shape and then the molded product is cut into a flat plate shape or a disk shape, and a flat plate-shaped or disk-shaped pellet is produced from this. According to such a flat plate-shaped or disk-shaped pellet, a stable quality is obtained since variations in the shape are significantly small and the shape is stabilized, and also irregularities are not formed on the surface and the pellet can be smoothly finished unlike a pellet granulated by using a pan type granulator. In addition, by subjecting the flat plate-shaped or disk-shaped pellet to a reduction and heat treatment in a reducing furnace, it is possible to uniformly generate a metal shell on the surface and to effectively prevent a decrease in efficiency of the reduction reaction and occurrence of variations in the composition of ferronickel to be obtained.

[Molding Step]

The molding step S211 is a step for molding the mixture of raw material powders (a mixture obtained by mixing at least nickel oxide ore and a carbonaceous reducing agent)

obtained in the mixing treatment step S1. Specifically, in the molding step S211, the mixture is molded into a rod shape or a cylindrical shape.

In the molding step S211, for example, the mixture can be molded by using a pellet molding apparatus. The pellet molding apparatus is not particularly limited, but it is preferably one that can knead and mold the mixture at a high pressure and a high shear force and it is preferably one that is particularly equipped with a twin-screw type kneading machine (twin-screw kneader). By kneading the mixture at a high pressure and high shear, it is possible to untangle the aggregation of the mixture of raw material powders, to effectively knead the mixture, and to enhance the strength of the pellet to be obtained. In addition, it is particularly preferable to use one that is equipped with a twin-screw kneader since it is possible not only to knead the mixture at a high pressure and high shear but also to continuously produce pellets while maintaining high productivity.

Incidentally, it is also possible to mold the mixture by using a briquette press, but there is a possibility that high shear cannot be applied and the strength of pellets is not sufficiently improved and, by this, cracking and collapse are likely to occur during the treatment, also variations in the shape occur, and the particle size is distributed in a wide range. In addition, in the case of using a briquette press, a portion protruding from the molded pellet (a portion which protrudes from between the molded pellet and the die and is called a so-called "ear") is formed and it is difficult to avoid decreases in quality and yield.

In addition, it is more preferable to use one in which a cutting machine is provided at the discharge port of a pellet molding apparatus to be used in order to continuously perform the operation of cutting the molded mixture in the cutting step S212 to be described later. By using such a pellet molding apparatus, it is possible to cut the molded mixture into a desired shape at a high accuracy and to produce pellets without variations in the shape in a continuous operation while maintaining high productivity. In addition, it is possible to diminish variations in the quality of pellets to be obtained by producing the pellets by a continuous treatment in this manner.

[Cutting Step]

The cutting step S212 is a step for cutting the rod-shaped or cylindrical mixture (molded product) obtained by molding. Specifically, in the cutting step S212, the rod-shaped or cylindrical molded product is cut into a flat plate shape or a disk shape. Here, the shape such as a flat plate shape or a disk shape is also expressed as a "disk shape".

Figure 4A:
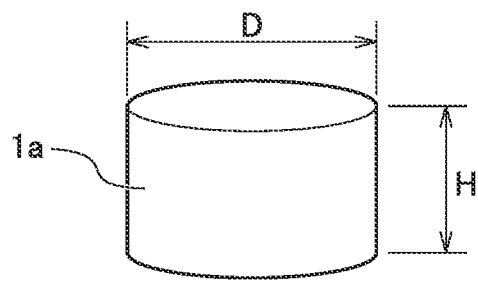
FIGS. 4A and 4B are views schematically illustrating a disk-shaped lump product (pellet) in a first embodiment.
Figure 4B:
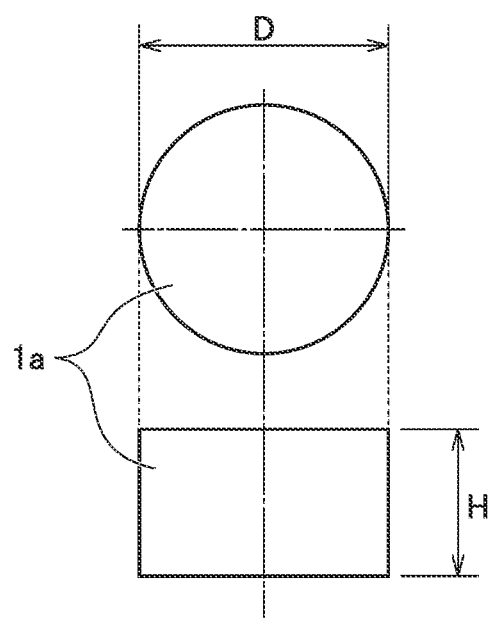

FIGS. 4A and 4B are views schematically illustrating a disk-shaped pellet which is a mixture-molded body and is obtained by cutting a molded product in the cutting step S212, and FIG. 4A is an external perspective view and FIG. 4B is a top view and a side view. This disk-shaped pellet illustrated in FIGS. 4A and 4B is denoted as the "pellet 1a". Incidentally, the disk-shaped pellet thus obtained can be dried in the mixture-molding step S2, and the shape of the pellet after being dried is also the same as that illustrated in the schematic view of FIGS. 4A and 4B.

The size of the disk-shaped pellet 1a is not particularly limited, but it is preferable that the diameter (D) thereof is about from 5 mm to 30 mm. In addition, the aspect ratio (the following Equation (1)), which is the ratio of the diameter (D) to the height (H), is preferably in a range of 0.3 or more and 2.0 or less and more preferably in a range of 0.5 or more and 1.5 or less.

$$\text{Aspect ratio}=D/H \quad \text{Equation (1)}$$

Incidentally, as illustrated in FIGS. 4A and 4B, the diameter (D) refers to the diameter of the disk surface when the pellet is viewed from the upper surface with one disk surface facing downward and the height (H) refers to the height from the disk surface, which is the bottom surface when the pellet is placed with one disk surface facing downward.

By forming the disk-shaped pellet 1a having an aspect ratio of preferably in a range of 0.3 or more and 2.0 or less and more preferably in a range of 0.5 or more and 1.5 or less in this manner, it is possible to effectively prevent the breaking of the pellets to be produced and this makes it possible to generate a uniform metal shell on the pellet surface and to conduct the desired reduction reaction.

In addition, by forming the disk-shaped pellet 1a in this manner and placing the pellet on the hearth of the reducing furnace so that the disk surface thereof faces downward, it is possible to prevent the pellets from moving or rolling in the reducing furnace, to stably conduct the reduction reaction, and to suppress variations in the composition. In addition, as the pellet is a disk-shaped pellet, the ferronickel metallized in the pellet uniformly precipitates, the metal is easily separated, and the recovery rate thereof can be improved.

Incidentally, as described above, it is preferable that the cutting treatment of the mixture in the cutting step S212 is performed by a continuous operation subsequent to the molding treatment in the molding step S211. Specifically, a pellet molding apparatus provided with a cutting machine at the discharge port is used, and the mixture is fed into the pellet molding apparatus and molded into a rod shape or a cylindrical shape and then the molded product to be discharged is cut into a disk shape by the cutting machine at the discharge port. It is possible to enhance the productivity and to diminish variations in the quality among the pellets by producing the pellet by a continuous treatment in this manner.

(2) Drying Treatment Step

The drying treatment step S22 is an arbitrary step for drying the mixture-molded body (disk-shaped pellet in the present embodiment) obtained in the lumping treatment step S21a. Here, the pellet obtained in the lumping treatment step S21a excessively contains moisture, for example, at about 50% by weight. For this reason, there is a case in which the moisture evaporates and expands at a time to destroy the pellet when the pellet containing excessive moisture is sharply heated to the reducing temperature.

Hence, by subjecting the pellet to a drying treatment and thus setting, for example, the solid components in the pellet to about 70% by weight and the moisture to about 30% by weight, it is possible to prevent the pellet from collapsing by the reduction and heat treatment in the reducing step S3 of the next step and this makes it possible to prevent the pellet from being hardly taken out from the reducing furnace. In addition, pellets are often in a sticky state because of excessive moisture, and handling of the pellets can be facilitated by subjecting the pellets to a drying treatment.

Specifically, the drying treatment of the pellets in the drying treatment step S22 is not particularly limited but, for example, the pellets are dried by blowing hot air at from 200° C. to 400° C. thereto. Here, the temperature of the hot air is set to preferably 200° C. and more preferably 300° C. Incidentally, it is preferable that the temperature of the pellets at the time of this drying treatment is set to a temperature less than 100° C. since the pellets are hardly destroyed.

Here, fissures and breaks may be present on the pellets before and after being dried in the case of drying a pellet having a particularly great volume. Fissures and breaks are often generated in the mixture in a case in which the volume of the pellet is great. However, a significant problem hardly arises in a case in which the volume of the pellet is great since the influence such as an increase in the surface area caused by fissures and breaks is slight. For this reason, fissures and breaks may be present on the pellets before and after being dried and before being reduced.

Incidentally, the drying treatment in the drying treatment step S22 can be omitted when the pellet is in a mode in which the destruction does not occur at the time of handling such as charging into a reducing furnace or the reduction and heat treatment.

An example of the composition (parts by weight) of solid components in the pellet after being subjected to a drying treatment is presented in the following Table 2. Incidentally, the composition of the pellet after being subjected to a drying treatment is not limited to this.

TABLE 2

| | Ni | $Fe_2O_3$ | $SiO_2$ | CaO | $Al_2O_3$ | MgO | Binder | Others |
|---|---|---|---|---|---|---|---|---|
| Composition of solid component in mixture after being dried [Parts by weight] | 0.5~1.5 | 50~60 | 8~15 | 4~8 | 1~6 | 2~7 | About 1 | Remainder |

[1-3. Reducing Step]

In the reducing step S3, the pellet obtained in the mixture-molding step S2 is reduced and heated at a predetermined reducing temperature. The smelting reaction (reduction reaction) proceeds and a metal and slag are generated by the reduction and heat treatment of the pellet in this reducing step S3.

The reduction and heat treatment in the reducing step S3 is performed by using a reducing furnace or the like. Specifically, the pellets are reduced and heated, for example, by being charged into a reducing furnace heated to a temperature of about 1400° C. Here, the lower limit of the reducing temperature can be set to preferably 1250° C. and more preferably 1300° C. In addition, the upper limit of the reducing temperature can be set to preferably 1450° C. and more preferably 1400° C. Incidentally, the "reducing temperature" in the present embodiment means the temperature of the portion at which the temperature is the highest in the furnace. For example, in the case of a movable hearth furnace, it is the temperature at the place to be substantially the center in the width direction (the direction intersecting the hearth moving direction at right angles and the direction in the plane in which the pellet laminate is placed). Particularly in the case of a rotary hearth furnace such as a rotary hearth furnace, it is the temperature in the vicinity of the center in the width direction (the radial direction from the central axis of the rotary hearth and the direction in the plane in which the pellet laminate is placed).

The time for performing the reduction and heat treatment in the reducing furnace is set depending on the temperature of the reducing furnace, but it is preferably 10 minutes or more and more preferably 15 minutes or more. On the other hand, the upper limit of the time for performing the reduction and heat treatment may be 50 minutes or less or 40 minutes or less from the viewpoint of suppressing an increase in manufacturing cost.

In the reduction and heat treatment in the reducing step S3, first, nickel oxide and iron oxide contained in the pellet are reduced and metallized in the vicinity of the pellet surface at which the reduction reaction is likely to proceed, for example, in a short time of about one minute to form an iron-nickel alloy and a shell (hereinafter also referred to as the "crust") is formed. Meanwhile, in the crust, the slag components contained in the pellet gradually melt and slag of a liquid phase is generated in association with the formation of crust. A metal composed of ferronickel (hereinafter simply referred to as the "metal") and slag composed of an oxide (hereinafter simply referred to as the "slag") are separately generated in one pellet by this.

Moreover, the carbon component of the excess carbonaceous reducing agent which is not involved in the reduction reaction is incorporated into the iron-nickel alloy to lower the melting point as the treatment time of the reduction and heat treatment in the reducing step S3 is extended to about 10 minutes. As a result, the iron-nickel alloy in which the carbon component is incorporated dissolves to form a liquid phase.

Particularly in the present embodiment, a disk-shaped pellet is produced and the pellet is reduced and heated in a reducing furnace, thus it is possible to stably generate a metal shell on the pellet surface, also the reduction reaction stably and efficiently proceeds by this, and ferronickel without having variations in the composition can be efficiently produced at high productivity.

As described above, the slag contained in the pellet melts to form a liquid phase by the reduction and heat treatment, but the metal and the slag which have been already separately generated do not mix with each other but form a mixed product in which the metal and the slag are present together as separate phases of a metal solid phase and a slag solid phase by subsequent cooling. The volume of this mixed product is contracted to a volume to be about from 50% to 60% of the volume of the mixture constituting the pellet charged.

A large lump of metal and slag are obtained from the pellets by the reduction reaction described above, and one mixed product in which one metal solid phase and one slag solid phase are present together is obtained from one pellet charged and a solid having a "daruma shape" is formed in a case in which the reduction reaction proceeds most ideally. Here, the "daruma shape" is a shape in which the metal solid phase and the slag solid phase are joined. In a case in which such a large lump of a solid metal is obtained, the solid metal is the largest as the particle size, thus it takes less time and labor to recover the metal, and it is also possible to suppress a decrease in the recovery rate of metal when recovering the metal from the reducing furnace.

In the present embodiment in which the pellet is charged into the reducing furnace as a mixture-molded body, a carbonaceous reducing agent (hereinafter also referred to as the "hearth carbonaceous reducing agent") may be spread on the hearth of the reducing furnace in advance and the pellet may be placed on the spread hearth carbonaceous reducing agent when charging the obtained pellet into the reducing furnace. In addition, after the pellet is charged into the reducing furnace, the pellet can be put into a state of being covered with the carbonaceous reducing agent. The strength of the pellet is more effectively maintained by performing the reduction and heat treatment in a state in which the pellet is charged in the reducing furnace in which the carbonaceous reducing agent is spread on the hearth or the pellet charged is surrounded with the carbonaceous reducing agent so as to be covered in this manner, and it is thus possible to effectively advance the smelting reaction while suppressing the collapse of pellets.

The reducing furnace to be used for the reduction and heat treatment is not particularly limited, but it is preferable to use a movable hearth furnace. By using a movable hearth furnace as a reducing furnace, the reduction reaction continuously proceeds and it is possible to complete the reaction in one facility and to more accurately control the treatment temperature as compared to the case of performing the treatments in the respective steps by using separate furnaces. In addition, it is possible to decrease heat loss between the respective treatments and to more efficiently perform the operation. In other words, in the case of performing the reactions by using separate furnaces, the temperature drops and heat loss occurs when moving the pellet from one furnace to another furnace, a change in the reaction atmosphere is also caused, and it is impossible to immediately conduct a reaction when the pellet is recharged into the furnace. In contrast, by performing the respective treatments in one facility by using a movable hearth furnace, the furnace atmosphere can be accurately controlled as well as the heat loss diminishes, and it is thus possible to more effectively advance the reaction. These make it possible to more effectively obtain an iron-nickel alloy having a high nickel grade.

The movable hearth furnace is not particularly limited, and a rotary hearth furnace, a roller hearth kiln, and the like can be used. Among these, for example, a rotary hearth furnace (rotary hearth furnace) which has a circular shape and is partitioned into a plurality of treatment regions can be used as a rotary hearth furnace. In this rotary hearth furnace, each treatment is performed in each region while the furnace rotates in a predetermined direction. At this time, the treatment temperature in each region can be adjusted by controlling the time (moving time, rotating time) when the pellet passes through each region, and the pellet is smelted every time the rotary hearth furnace rotates one time.

[1-4. Separating Step]

In the separating step S4, the metal and the slag which have been generated in the reducing step S3 are separated from each other and the metal is recovered. Specifically, the metal phase is separated from the mixed product containing a metal phase (metal solid phase) and a slag phase (slag solid phase) obtained by the reduction and heat treatment and recovered.

As a method for separating the metal phase and slag phase in the mixed product which is composed of the metal phase and the slag phase and is obtained as a solid from each other, for example, methods such as separation by specific gravity and separation by magnetic force can be utilized in addition to removal of unnecessary substances by sieving.

In addition, the metal phase and slag phase obtained can be easily separated from each other since these exhibit poor wettability, and it is possible to easily separate the metal phase and slag phase in the mixed product from each other by imparting an impact to the large mixed product obtained in the reducing step S3 described above, for example, falling down the large mixed product at a predetermined falling distance or applying a predetermined vibration to the large mixed product at the time of sieving.

The metal phase is recovered by separating the metal phase and the slag phase from each other in this manner.

2. Second Embodiment

In the oxide ore smelting method according to the second embodiment, a metal and slag are generated by forming a pellet, which is a mixture-molded body, from a mixture of raw materials including an oxide ore, which is a raw material ore, charging one obtained by laminating the pellet into a smelting furnace (reducing furnace), and subjecting this to a reduction treatment. More specifically, a mixture of at least nickel oxide ore and a carbonaceous reducing agent is molded to form a pellet having, for example, a rectangular parallelepiped or cylindrical shape, a pellet laminate is formed by laminating the pellet, and the pellet laminate is subjected to a reduction treatment by heating in a smelting furnace (reducing furnace).

[2-1. Mixture-Molding Step]

In the present embodiment, the oxide ore smelting method includes the lumping treatment step S21a in the mixture-molding step S2 illustrated in FIG. 2. Here, in the present embodiment, the mixture-molding step S2 may include an arbitrary drying treatment step S22 for drying the mixture after the lumping treatment step S21a.

(1) Lumping Treatment Step

In the present embodiment, in the mixture-molding step S2, the shape into which the mixture is molded in the lumping treatment step S21a, namely, the shape of pellet may be any shape as long as it can be laminated, but it is preferably a cubic, rectangular parallelepiped, cylindrical or spherical shape, it is more preferably a cubic, rectangular parallelepiped or cylindrical shape, and it is still more preferably a cubic or rectangular parallelepiped shape. It is easy to mold the mixture into a pellet by molding the mixture into a cubic, rectangular parallelepiped, cylindrical or spherical shape, and it is thus possible to diminish the cost required for molding. In addition, it is possible to decrease the generation of pellets defectively molded since the shape to be molded is not complicated.

In particular, by molding the mixture into a cubic, rectangular parallelepiped or cylindrical shape, the pellets can be laminated in the height direction to bring the planes into contact with each other, stable lamination is possible, and thus pellets exhibiting uniform quality can be easily obtained. In addition, it is possible to efficiently charge the pellet into the furnace of the reducing furnace and thus to increase the amount of pellets to be reduced by one time of reduction and heat treatment even without enlarging the shape of the single pellet. Furthermore, the pellet laminate is less likely to collapse when being charged into a reducing furnace, and the like, and thus the generation of defective products can be decreased.

Among these, by molding the mixture into a cubic or rectangular parallelepiped shape, it is possible to increase the contact area between adjacent pellets, particularly even when the pellets are arranged in a direction parallel to the hearth, this decreases the formation of shell at the place at which the adjacent pellets face each other, and it is thus possible to easily obtain a larger and higher grade metal.

It is preferable that the size of the pellet after being molded in the lumping treatment step S21a is a volume of 8000 mm$^3$ or more. By setting the volume of the pellet to 8000 mm$^3$ or more, the cost required for molding a pellet is saved, handling of the pellet is facilitated, and the number of steps when forming the pellet laminate can be decreased. In addition, the proportion of the surface area with respect to the entire pellet decreases, this decreases the difference in the reduction rate between the surface and inside of the pellet laminate, and it is thus possible to easily obtain high quality ferronickel.

On the other hand, the upper limit of the size of pellet is not particularly limited, but the optimum shape and volume may be selected depending on the characteristics of the reducing furnace and the like and manufacturing conditions. As a specific example, the volume may be, for example, $1 \times 10^6$ mm$^3$ or less or $1 \times 10^5$ mm$^3$ or less from the viewpoint of suppressing deterioration in handling property due to an increase in mass of pellet.

In the lumping treatment step S21$a$, moisture required for lumping is added to the mixture if necessary and then the mixture can be molded into a pellet by using, for example, a pellet molding apparatus (a compression molding machine, an extrusion molding machine, or the like. Alternatively, referred to as the pelletizer as well) or the like.

The pellet molding apparatus is not particularly limited, but it is preferably one that can knead and mold the mixture at a high pressure and a high shear force and it is preferably one that is particularly equipped with a twin-screw type kneading machine (twin-screw kneader). By kneading the mixture at a high pressure and high shear, it is possible to untangle aggregation of the carbon reducing agent, the raw material powders and the like, to effectively knead the mixture, and to enhance the strength of the pellet to be obtained. In addition, it is particularly preferable to use one that is equipped with a twin-screw kneader since it is possible not only to knead the mixture at a high pressure and high shear but also to continuously produce pellets while maintaining high productivity.

Incidentally, it is also possible to mold the mixture by using a briquette press, but there is a possibility that high shear cannot be applied and the strength of pellets is not sufficiently improved and, by this, cracking and collapse are likely to occur during the treatment, also variations in the shape occur, and the particle size is distributed in a wide range. In addition, in the case of using a briquette press, a portion protruding from the molded pellet (a portion which protrudes from between the molded pellet and the die and is called a so-called "ear") is formed and it is difficult to avoid decreases in quality and yield.

[2-2. Reducing Step]

In the reducing step S3, the pellets obtained in the mixture-molding step S2 are laminated to form a pellet laminate and this pellet laminate is charged into a reducing furnace and reduced and heated at a predetermined reducing temperature. The smelting reaction (reduction reaction) proceeds and a metal and slag are generated by subjecting the pellet laminate to a heat treatment in this manner.

Figure 5:
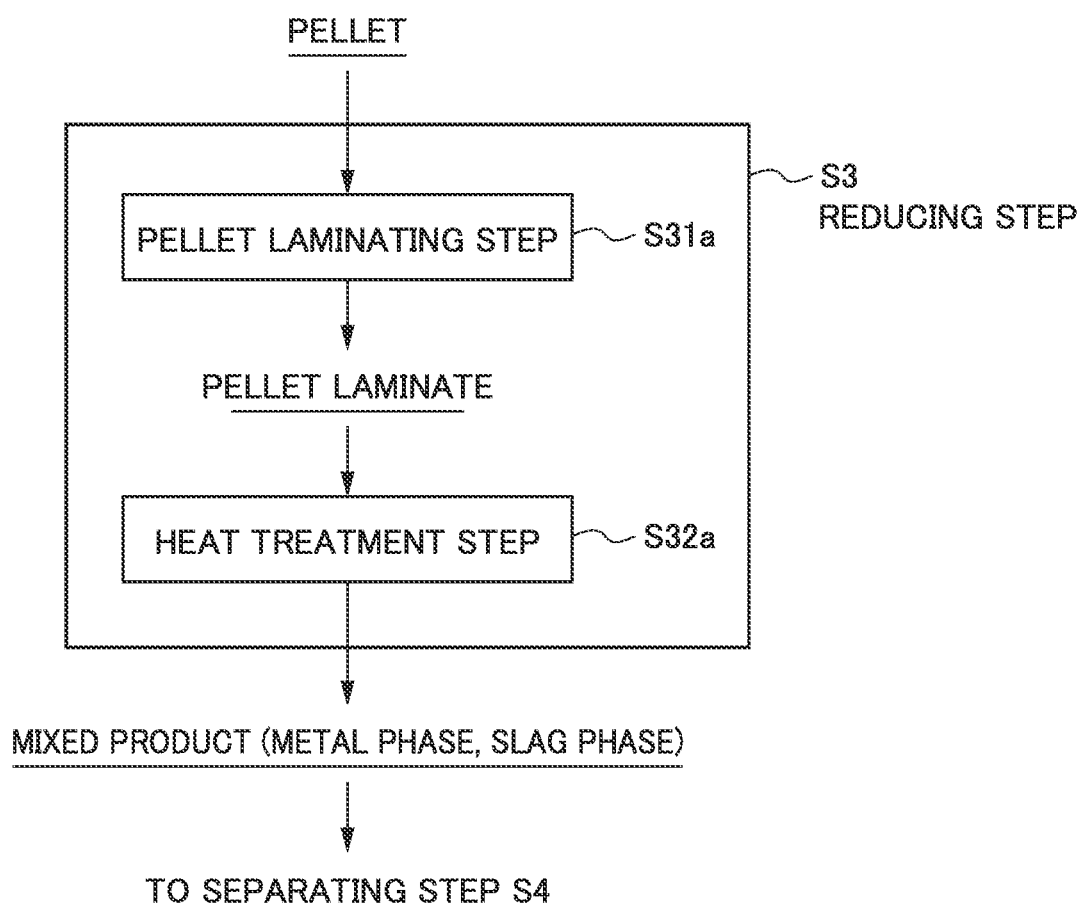
FIG. 5 is a treatment flowchart illustrating an example of the flow of treatments in a reducing step in a second embodiment.

FIG. 5 is a treatment flowchart illustrating the flow of treatments in the reducing step S3. In the present embodiment, the reducing step S3 includes a pellet laminating step S31$a$ for laminating pellets to form a pellet laminate and a heat treatment step S32$b$ for reducing and heating the pellet laminate to obtain a mixed product of a metal phase and a slag phase.

(1) Pellet Laminating Step

Figure 6:
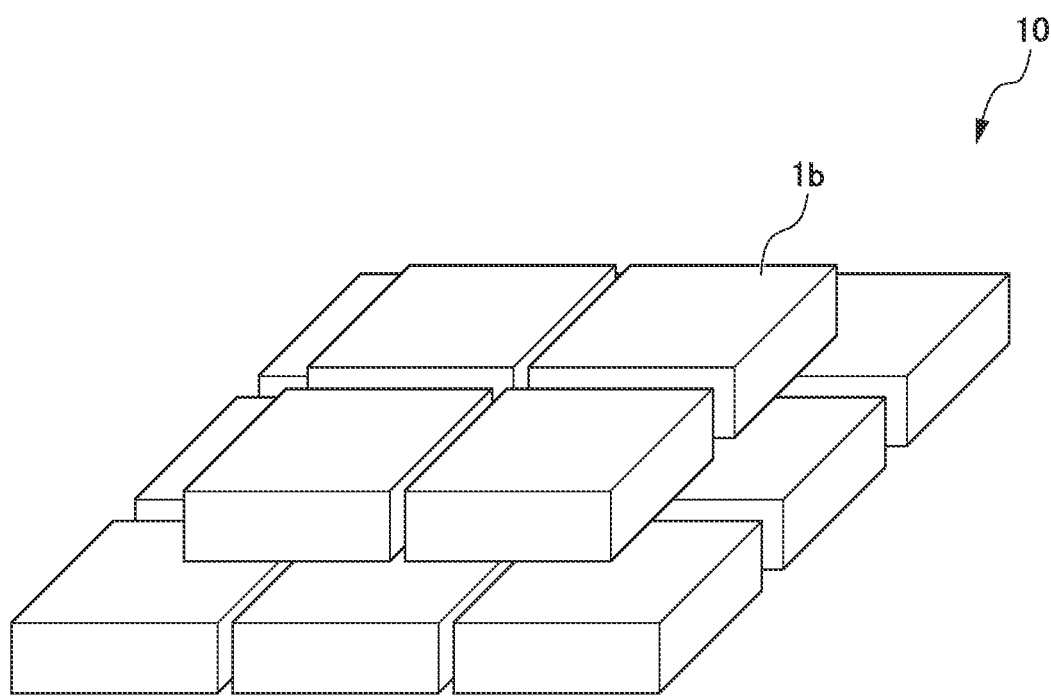
FIG. 6 is a perspective view schematically illustrating a pellet laminate in a second embodiment.

The pellet laminating step S31$a$ is a step for laminating pellets to form a pellet laminate. By forming a pellet laminate in this manner, a pellet laminate can be formed by disposing the subdivided pellets at a predetermined location such as the hearth of the reducing furnace as well as the amount of pellets to be reduced by one time of reduction and heat treatment increases, and it is thus possible to enhance the handling property when placing the pellet in the reducing furnace. Incidentally, an example (pellet laminate 10) of the pellet laminate to be obtained by laminating pellets 1$b$ is illustrated in FIG. 6.

The number of stages in the height direction when laminating the pellets may be two or more, and it is more preferably three or more. It is possible to obtain higher quality metal by increasing the number of stages when laminating the pellets. In addition, it is possible to increase the particle diameter of the metal to be recovered and to increase the recovery rate of the metal. Particularly when the pellets are laminated in three or more stages, it is possible to further decrease the influence of oxygen and the like in the furnace atmosphere, the occupancy rate of pellet in the furnace increases, a uniform treatment is likely to be performed, and it is thus possible to increase the recovery rate of metal by increasing the volume of the pellets.

Incidentally, the number of stages when laminating the pellets may be defined as "two stages" when the highest height of the pellet laminate is more than 1 time and 2 times or less the highest height of the pellet and "three stages" when the highest height of the pellet laminate is more than 2 times and 3 times or less the highest height of the pellet.

It is preferable that the pellets adjacent in the direction parallel to the hearth are disposed so as to be in contact with each other when the pellets are laminated. By disposing the pellets so as to be adjacent to each other, the formation of shell at the place at which the adjacent pellets face each other decreases and it is thus possible to easily obtain a larger and higher grade metal. Incidentally, the direction parallel to the hearth refers to a direction perpendicular to the height direction in which the pellets are laminated, namely, the horizontal direction.

FIG. 6 is a perspective view schematically illustrating a pellet laminate in the present embodiment. As illustrated in FIG. 6, the pellets 1$b$ may be disposed so that the number of pellets 1$b$ at the upper stage is smaller than that at the lower stage to form the pellet laminate 10 when laminating the pellets. On the other hand, the pellets 1$b$ may be disposed so that the number of pellets 1$b$ at the lower stage is the same as the number of pellets 1$b$ at the upper stage to form the pellet laminate 10.

In the pellet laminating step S31$a$, a carbonaceous reducing agent (hereinafter also referred to as the "hearth carbonaceous reducing agent") may be spread on the hearth of the reducing furnace in advance and the pellets may be placed on the hearth carbonaceous reducing agent spread to form a pellet laminate when charging the pellet laminate into the reducing furnace. In addition, the pellet laminate placed on the hearth carbonaceous reducing agent can be put into a state of being further covered with the carbonaceous reducing agent. The strength of pellets constituting the pellet laminate is more effectively maintained by forming a pellet laminate in a reducing furnace in which a carbonaceous reducing agent is spread on the hearth and further subjecting the pellet laminate to a reduction and heat treatment in a state in which the pellet laminate is surrounded by the carbonaceous reducing agent so as to be covered in this manner, and it is thus possible to effectively advance the smelting reaction while suppressing collapse of the pellets.

(2) Heat Treatment Step

In the heat treatment step S32$a$, the pellet laminate is charged into a reducing furnace and reduced and heated at a predetermined reducing temperature. The smelting reaction (reduction reaction) proceeds and a metal and slag are generated by subjecting the pellet laminate to a heat treatment. Incidentally, the heat treatment step S32a is not limited to a mode in which a pellet laminate is formed outside a reducing furnace in advance, then charged into the reducing furnace, and treated, and the pellets may be charged into a reducing furnace one by one and a pellet laminate may be formed by laminating the pellets inside the reducing furnace and treated.

In the present embodiment, the amount of pellets treated by one time of reduction and heat treatment increases as the pellet laminate is subjected to the reduction and heat treatment, and it is thus possible to outstandingly increase the treatment efficiency in the reduction and heat treatment. In addition, the apparent volume of pellets when performing the reduction and heat treatment increases, thus variations in the composition are significantly small, and it is possible to easily obtain a higher quality metal.

The reduction and heat treatment in the heat treatment step S32a is performed in the same manner as the reducing step S3 in the first embodiment by using a reducing furnace or the like.

In the present embodiment, nickel oxide and iron oxide are first reduced and metallized in the vicinity of the surface of the pellet laminate, at which the reduction reaction is likely to proceed, by the reduction and heat treatment in the heat treatment step S32a to form an iron-nickel alloy and a shell (hereinafter also referred to as the "crust") is formed. For this reason, a metal composed of an alloy such as ferronickel and a metal (hereinafter simply referred to as the "metal") and slag composed of oxides (hereinafter simply referred to as the "slag") are separately generated in one pellet laminate.

In the present embodiment, the pellet laminate after being subjected to the reduction and heat treatment is a mixed product of a large lump of metal and slag. A large lump of metal is likely to be formed by subjecting a pellet laminate having a large apparent volume to the reduction and heat treatment, and it is thus possible to save the time and labor for recovery when recovering the metal from the reducing furnace and to effectively suppress a decrease in the recovery rate of metal.

Incidentally, the mixing treatment step S1, the drying treatment step S22 in the mixture-molding step S2, and the separating step S4 are the same as the modes in the manufacturing method of the first embodiment, and the detailed description thereon will be omitted.

3. Third Embodiment

In the oxide ore smelting method according to the third embodiment, a mixture-molded body molded so as to have a thickness of 17 mm or more is charged into a reducing furnace and subjected to a reduction treatment by heating. For example, a mixture of at least nickel oxide ore and a carbonaceous reducing agent is molded into a pellet having a thickness of 17 mm or more and this pellet is charged into a smelting furnace (reducing furnace) and subjected to a reduction treatment by heating.

[3-1. Mixture-Molding Step]

In the present embodiment, the oxide ore smelting method includes the lumping treatment step S21a in the mixture-molding step S2 illustrated in FIG. 2. Here, in the present embodiment, the mixture-molding step S2 may include an arbitrary drying treatment step S22 for drying the mixture after the lumping treatment step S21a.

Figure 7A:
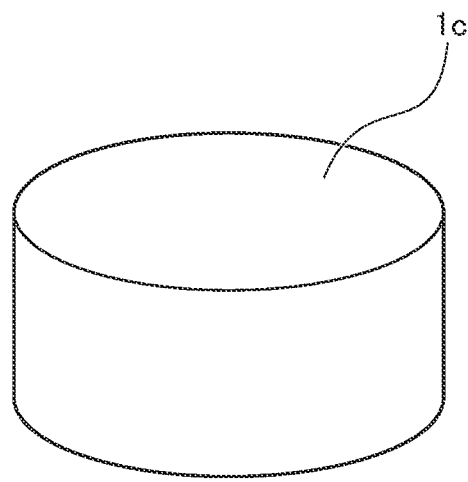
FIGS. 7A and 7B are perspective and side sectional views which illustrate an example of a pellet in a third embodiment.
Figure 7B:
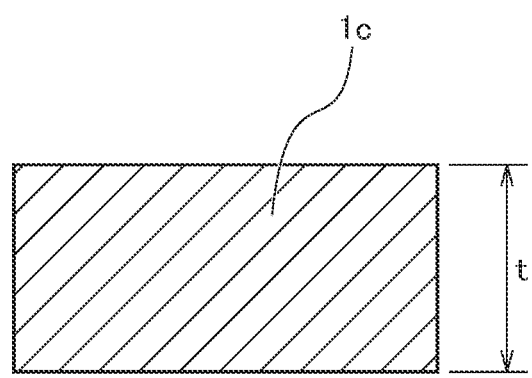

FIG. 7A is a perspective view and FIG. 7B is a side sectional view, which illustrate an example of the shape of a pellet. In the present embodiment, in the lumping treatment step S21a of the mixture-molding step S2, it is preferable to mold (lump) the mixture so as to have a portion at which the thickness (height) t of a pellet 1c, which is a mixture-molded body, is 17 mm or more and it is more preferable to mold (lump) the mixture so as to have a portion at which the thickness (height) t is 30 mm or more. A more amount of ferronickel metal precipitates at the lower part as the thickness t of the pellet 1c is increased, and it is thus possible to easily produce larger ferronickel. In addition, the proportion of the surface area with respect to the volume of the pellet 1c decreases, and it is thus possible to decrease the difference in reduction rate between the surface and inside of the pellet 1c and to easily produce ferronickel exhibiting high quality and extremely high uniformity in the composition. In addition, it is possible to easily charge the pellet into the reducing furnace and take out the pellet from the reducing furnace by increasing the thickness t of the pellet 1c since the productivity is enhanced as the throughput by one time of reduction treatment increases and the handling property is enhanced.

The thickness t of the pellet 1c does not have a specific upper limit value, and it may be set to a size so that the pellet can be charged into the reducing furnace in the actual operation and the heat to heat the pellet is sufficiently transmitted to the pellet at the time of reduction.

On the other hand, the pellet laminate may be formed so as to have a thickness of 17 mm or more by charging the pellets into the reducing furnace in two or more stages so that the pellets overlap one another in the reducing step S3 after molding is performed in the mixture-molding step S2, and in this case, the lower limit of the thickness t of the pellet is not limited. It is possible to increase the amount of pellets to be reduced by one time of reduction and heat treatment while enhancing the handling property when the pellets are placed in the reducing furnace by laminating the pellets in two or more stages. This makes it possible to generate a large metal.

The shape of pellet is a shape having a thickness t in a predetermined range, and it may be a shape in which the pellet can be charged into the reducing furnace so that the thickness t is the height from the placing surface of the reducing furnace. Among these, the sizes other than the size in the thickness direction (height direction) are preferably not less than 17 mm and more preferably not less than 30 mm. It is possible to easily exert the effect when the thickness of pellet is increased by setting the sizes other than the size in the thickness direction (height direction) not to be in a range less than a predetermined range.

Examples of the shape of pellet may include a cubic shape, a rectangular parallelepiped shape, a cylindrical shape or a spherical shape. It is easy to mold the mixture into a pellet by molding the mixture particularly into a cubic, rectangular parallelepiped, cylindrical or spherical shape, and it is thus possible to diminish the cost required for molding. In addition, it is possible to decrease the generation of pellets defectively molded since the shape to be molded is not complicated.

In the lumping treatment step S21a, moisture required for lumping can be added to the mixture if necessary and then the mixture can be molded into a pellet by using, for example, a lump product manufacturing apparatus in the same manner as in the second embodiment.

In the present embodiment, a larger ferronickel metal is generated as a pellet having a predetermined thickness or more is subjected to a reduction and heat treatment and thus the metal obtained by the reduction precipitates in the pellet.

Hence, the ferronickel metal can be easily separated by a treatment such as magnetic separation while suppressing loss in terms of manufacturing efficiency, and the metal can be recovered at a high recovery rate. In addition, the difference in reduction rate between the surface and inside of the pellet can be decreased as the proportion of the surface area with respect to the volume of the pellet decreases, and it is thus possible to easily produce ferronickel exhibiting high quality and extremely high uniformity in the composition.

Incidentally, the mixing treatment step S1, the drying treatment step S22 in the mixture-molding step S2, the reducing step S3, and the separating step S4 are the same as the modes in the manufacturing method of the first embodiment, and the detailed description thereon will be omitted.

4. Fourth Embodiment

In the oxide ore smelting method according to the fourth embodiment, a mixture-molded body molded so as to have a shortest length from the center to the surface of the mixture-molded body of 10.0 mm or more is charged into a reducing furnace and subjected to a reduction treatment by heating. For example, a mixture of at least nickel oxide ore and a carbonaceous reducing agent is molded into a pellet, which is a mixture-molded body having a shortest length from the center to the surface of 10 mm or more, and this pellet is charged into a smelting furnace and subjected to a reduction treatment by heating.

[4-1. Mixture-Molding Step]

In the present embodiment, the oxide ore smelting method includes the lumping treatment step S21a in the mixture-molding step S2 illustrated in FIG. 2. Here, in the present embodiment, the mixture-molding step S2 may include an arbitrary drying treatment step S22 for drying the mixture after the lumping treatment step S21a.

Figure 8A:
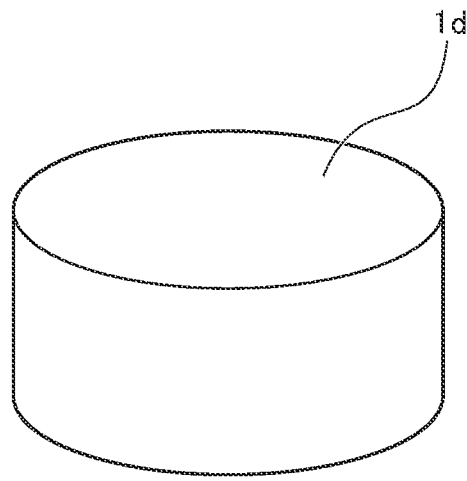
FIGS. 8A and 8B are perspective and side sectional views which illustrate an example of a pellet in a fourth embodiment.
Figure 8B:
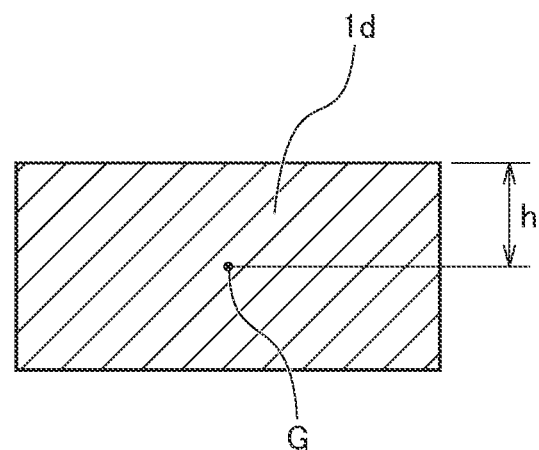

FIG. 8A is a perspective view and FIG. 8B is a side sectional view, which illustrate an example of the shape of a pellet. In the present embodiment, in the lumping treatment step S21a of the mixture-molding step S2, it is preferable to mold (lump) the mixture so that the shortest length h from the center to the surface of a pellet 1d, which is a mixture-molded body, is 10 mm or more and it is more preferable to mold (lump) the mixture so that the shortest length h is 18 mm or more. The reduction reaction is likely to uniformly take place by setting the shortest length h from the center to the surface of the pellet 1d to a long length of 10 mm or more, and it is thus possible to easily produce high quality ferronickel. In addition, it is possible to easily charge the pellet into the reducing furnace and take out the pellet from the reducing furnace by increasing the size of the pellet 1d since the productivity is enhanced as the throughput by one time of reduction treatment increases and the handling property is enhanced as the degree of freedom of the shape is increased. Examples of the reason why the reduction reaction is likely to uniformly take place in this manner may include a fact that the proportion of the mixture affected by the atmosphere in the reducing furnace in the vicinity of the surface of the pellet 1d decreases as this shortest length h is increased.

The shortest length h from the center to the surface of the pellet 1d does not have a specific upper limit value, and it may be set to a size so that the pellet can be charged into the reducing furnace in the actual operation and the heat to heat the pellet is sufficiently transmitted to the pellet at the time of reduction.

On the other hand, the pellet laminate may be formed so as to have a length from the center of 10 mm or more by charging the pellets into the reducing furnace in two or more stages so that the pellets overlap one another in the reducing step S3 after molding is performed in the mixture-molding step S2, and in this case, the lower limit of the thickness t of the pellet is not limited. It is possible to increase the amount of pellets to be reduced by one time of reduction and heat treatment while enhancing the handling property when the pellets are placed in the reducing furnace by laminating the pellets in two or more stages. This makes it possible to generate a large metal.

The shape of pellet is not particularly limited as long as the shortest length h from the center to the surface is in a predetermined range, but for example, the mixture can be molded into a cubic, rectangular parallelepiped, cylindrical or spherical shape. It is easy to mold the mixture into a pellet by molding the mixture into a cubic, rectangular parallelepiped, cylindrical or spherical shape, and it is thus possible to diminish the cost required for molding. In addition, it is possible to decrease the generation of pellets defectively molded since the shape to be molded is not complicated.

In the lumping treatment step S21a, moisture required for lumping can be added to the mixture if necessary and then the mixture can be molded into a pellet by using, for example, a lump product manufacturing apparatus in the same manner as in the second embodiment. Here, a granulating machine such as a pan type granulator may be used particularly in the case of molding the mixture into a spherical pellet.

In the present embodiment, a pellet molded so that the shortest length from the center to the surface is 10 mm or more is subjected to a reduction and heat treatment. It is possible to easily produce larger ferronickel by subjecting a pellet, in which the shortest length from the center to the surface is equal to or longer than a predetermined length, to a reduction and heat treatment in this manner. In addition, the difference in reduction rate between the surface and inside of the pellet can be decreased as the proportion of the surface area with respect to the volume of the pellet decreases, and it is thus possible to easily produce ferronickel exhibiting high quality and extremely high uniformity in the composition.

Incidentally, the mixing treatment step S1, the drying treatment step S22 in the mixture-molding step S2, the reducing step S3, and the separating step S4 are the same as the modes in the manufacturing method of the first embodiment, and the detailed description thereon will be omitted.

5. Fifth Embodiment

In the oxide ore smelting method according to the fifth embodiment, a mixture is molded in a thickness corresponding to the temperature distribution in the reducing furnace to obtain a mixture-molded body (pellet) and the mixture-molded body is charged into the place corresponding to the temperature distribution in the reducing furnace and heated. For example, the mixture-molded body is charged into the place at which the temperature is the highest in the temperature distribution in the reducing furnace so that the thickness of the mixture-molded body to be charged is the thickest and heated.

[5-1. Mixture-Molding Step]

In the present embodiment, the oxide ore smelting method includes the lumping treatment step S21a in the mixture-molding step S2 illustrated in FIG. 2. Here, in the present embodiment, the mixture-molding step S2 may include an arbitrary drying treatment step S22 for drying the mixture after the lumping treatment step S21a.

In the present embodiment, in the lumping treatment step S21a of the mixture-molding step S2, molding (lumping) is performed so that the thickness of the mixture-molded body (pellet) is a thickness corresponding to the temperature distribution in the reducing furnace. This makes it possible to charge a mixture-molded body having an adjusted thickness into the place corresponding to the temperature distribution in the reducing furnace in the reducing step S3 to be described later.

Here, in the present embodiment, the "temperature distribution in the reducing furnace" can be the temperature distribution at the portion, at which the mixture-molded body such as a pellet is heated, in the reducing furnace. The temperature distribution can be the temperature distribution of the plane constituting the hearth particularly in a mode in which the mixture-molded body is charged into the planar hearth and heated thereon. This "temperature distribution in the reducing furnace" may be the temperature distribution measured when the empty reducing furnace is heated at the reducing temperature prior to the reduction and heat treatment in the reducing furnace or the empirical temperature distribution when the mixture-molded body is reduced by using the reducing furnace.

In the lumping treatment step S21a, it is preferable to mold the mixture so that the thickness of the mixture-molded body to be charged into the place, at which the temperature is the highest in the temperature distribution in the reducing furnace, is the thickest. Particularly in the case of forming a relatively small mixture-molded body such as a pellet, it is preferable to mold the mixture so that the thickness of the mixture-molded body to be charged into the place, at which the temperature is low in the temperature distribution in the reducing furnace, is thinner. In addition, in the case of forming a relatively large mixture-molded body such as a briquette, it is preferable to mold the mixture so that the thickness of the mixture-molded body is thinner as the temperature in the temperature distribution in the reducing furnace is lower when the place having the highest temperature in the reducing furnace overlaps the place having the thickest thickness of the mixture-molded body to be molded.

In addition, it is preferable that the mixture-molded body has a shape so that the thickness of the molding decreases in a range of 0.20% or more and 0.80% or less every time the temperature in the temperature distribution in the reducing furnace described above decreases by 1.0° C. when the thickness of the mixture-molded body at the place having the thickest thickness is taken as 100%. A decrease in the thickness of the mixture-molded body is preferably 0.20% or more, more preferably 0.40% or more, and still more preferably 0.50% or more particularly every time the temperature in the temperature distribution decreases by 1.0° C. On the other hand, a decrease in the thickness of the mixture-molded body is preferably 0.80% or less and more preferably 0.70% or less every time the temperature in the temperature distribution decreases by 1.0° C. The effect can be still more remarkably exerted by forming a mixture-molded body having such a thickness.

In addition, it is more preferable to adjust the thickness of the mixture-molded body in the entire width direction of the reducing furnace so that the decrease value in thickness of the mixture-molded body to be charged is substantially constant every time the temperature in the temperature distribution decreases by 1.0° C. The mixture-molded body at the place having a high temperature is thick and the mixture-molded body at the place having a low temperature is thin as the temperature distribution in the reducing furnace and the thickness distribution of the mixture-molded body when the size in the width direction of the reducing furnace is taken as the horizontal axis are curved lines having a similar shape by this, and it is thus possible to easily perform a uniform reduction treatment.

Incidentally, the decrease value in thickness every time the temperature in the temperature distribution in the reducing furnace decreases by 1.0° C. is determined from the ratio of the difference in thickness of the mixture-molded body to the difference in temperature at the place at which the temperature is the highest and the place at which the temperature is the lowest in the reducing furnace. The decrease value in thickness is determined from the ratio of the difference in the average value of the thickness to the difference in temperature particularly in a case in which there are a plurality of places at which the temperature is the highest and a plurality of places at which the temperature is the lowest.

The planar shape of the mixture-molded body to be formed in the lumping treatment step S21a is not particularly limited, but the mixture can be molded into, for example, a substantially rectangular parallelepiped shape or a substantially cylindrical shape. It is easy to mold the mixture into a mixture-molded body by molding the mixture into a substantially rectangular parallelepiped shape or a substantially cylindrical shape, and it is thus possible to diminish the cost required for molding. In addition, it is possible to diminish the occurrence of defective molding since the shape to be molded is not complicated.

In the lumping treatment step S21a, moisture required for lumping can be added to the mixture if necessary and then the mixture can be molded into a mixture-molded body by using, for example, a lump product manufacturing apparatus in the same manner as in the second embodiment. At this time, the mixture may be molded into a pellet shape or a briquette shape, and a granulating machine such as a pan type granulator may be used particularly in the case of molding the mixture into a spherical pellet.

[5-2. Reducing Step]

Figure 9:
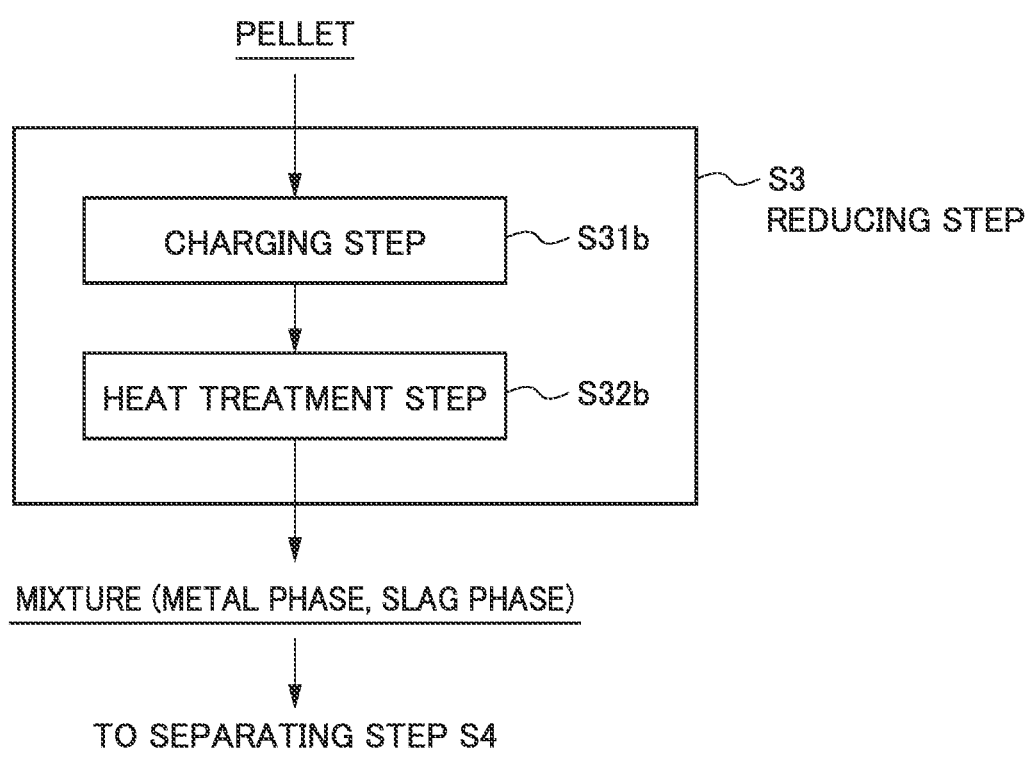
FIG. 9 is a treatment flowchart illustrating an example of the flow of treatments in a reducing step in a fifth embodiment.

In the reducing step S3, the mixture-molded body (pellet) obtained in the mixture-molding step S2 is charged into a reducing furnace and reduced and heated at a predetermined reducing temperature. FIG. 9 is a treatment flowchart illustrating the flow of treatments in the reducing step S3. In the present embodiment, the reducing step S3 includes a charging step S31b for charging the mixture-molded body so as to have a predetermined thickness and a heat treatment step S32b for reducing and heating the charged mixture-molded body.

(1) Charging Step

The charging step S31b is a step for charging the mixture-molded body of which the thickness has been adjusted in the mixture-molding step S2 into a place corresponding to the temperature distribution in the reducing furnace. In the reducing furnace, a greater quantity of thermal energy is supplied to a place having a higher reducing temperature as compared with a place having a lower reducing temperature and thus the reduction reaction relatively easily proceeds at the place having a higher reducing temperature. Hence, it is possible to uniformly advance the reduction reaction in the reducing furnace by charging the mixture-molded body into the reducing furnace so that the mixture-molded body is thick at the place having a higher reducing temperature and the mixture-molded body is thin at the place having a lower reducing temperature, and it is thus possible to produce high quality ferronickel.

It is preferable that the mixture-molded body to be charged into the reducing furnace in the charging step S31b is charged so as to have the thickest thickness at the place at which the temperature is the highest in the temperature distribution in the reducing furnace. It is preferable to charge the mixture-molded body having the thickest thickness into the place at which the temperature is the highest in the temperature distribution in the reducing furnace particularly in the case of charging a relatively small pellet-shaped mixture-molded body. In addition, in the case of charging a relatively large mixture-molded body such as a briquette, it is preferable to charge the mixture-molded body so that the place at which the temperature is the highest in the reducing furnace overlaps the place at which the thickness is the thickest in the mixture-molded body and then the thickness of the mixture-molded body is thinner as the temperature is lower in the temperature distribution. The thickness of the mixture-molded body to be charged into the place having a high temperature in the reducing furnace in the reducing step S3 to be described later increases by charging the mixture-molded body in this manner, and it is thus possible to easily perform a uniform reduction treatment.

The charging of the mixture-molded body in the charging step S31b can be performed by charging the mixture-molded body molded into a thickness having a predetermined relation with the temperature distribution into a predetermined place into which the mixture-molded body is charged, for example, the hearth of the reducing furnace.

Here, one briquette-shaped mixture-molded body may be charged or a plurality of smaller pellet-shaped mixture-molded bodies may be charged side by side when charging the mixture charged. It is possible to easily charge the mixture-molded body into the reducing furnace and to increase the throughput by one time of reduction treatment particularly by charging a briquette-shaped mixture-molded body. In addition, a larger metal can be generated and high quality ferronickel having extremely small variations in the composition can be obtained as the throughput by one time of reduction treatment increases.

In addition, the mixture-molded bodies may be charged in two or more stages so as to overlap one another when charging the mixture-molded body. It is possible to outstandingly increase the throughput by one time of reduction treatment by laminating the mixture-molded bodies in two or more stages in this manner.

In the charging step S31b, a carbonaceous reducing agent (hereinafter also referred to as the "hearth carbonaceous reducing agent") may be spread on the hearth of the reducing furnace in advance and the mixture-molded body may be placed on the spread hearth carbonaceous reducing agent. In addition, after the mixture-molded body is charged into the reducing furnace, the mixture-molded body can be put into a state of being covered with the carbonaceous reducing agent. It is possible to rapidly advance the smelting reaction while suppressing the collapse of mixture-molded bodies by performing the reduction and heat treatment in a state in which the mixture-molded body is charged in the reducing furnace in which the carbonaceous reducing agent is spread on the hearth or the charged mixture-molded body is surrounded with the carbonaceous reducing agent so as to be covered in this manner.

(2) Heat Treatment Step

The heat treatment step S32b is a step for reducing and heating the mixture-molded body charged in the reducing furnace at a predetermined reducing temperature. The smelting reaction (reduction reaction) proceeds and a metal and slag are generated by subjecting the mixture-molded body to a heat treatment.

The reduction and heat treatment in the heat treatment step S32b is performed in the same manner as the reducing step S3 in the first embodiment by using a reducing furnace or the like.

Here, the treatment time in the heat treatment step S32b is set depending on the temperature of the reducing furnace, but it is preferably 10 minutes or more and more preferably 20 minutes or more. On the other hand, the upper limit of the time for performing the reduction and heat treatment may be set to 60 minutes or less or 50 minutes or less from the viewpoint of suppressing an increase in manufacturing cost.

The reducing furnace to be used for the reduction and heat treatment is not particularly limited, but it is preferable to use a movable hearth furnace in the same manner as in the first embodiment. Incidentally, the temperature distribution in the furnace in the case of using a movable hearth furnace can be the temperature distribution in the region in which the temperature is the highest.

Particularly, in the present embodiment, it is possible to more efficiently advance the reduction reaction and to generate a larger ferronickel metal by charging a mixture-molded body, which is composed of a mixture of an oxide ore and molded to have a thickness adjusted depending on the temperature distribution in the reducing furnace, into the place corresponding to the temperature distribution in the reducing furnace and subjecting the mixture-molded body thus placed to a reduction and heat treatment in the reducing step S3. Hence, the ferronickel metal can be easily separated by a treatment such as magnetic separation while suppressing loss in terms of manufacturing efficiency, and the metal can be recovered at a high recovery rate.

Incidentally, the mixing treatment step S1, the drying treatment step S22 in the mixture-molding step S2, and the separating step S4 are the same as the modes in the manufacturing method of the first embodiment, and the detailed description thereon will be omitted.

6. Sixth Embodiment

In the oxide ore smelting method according to the sixth embodiment, a mixture of at least an oxide ore and a carbonaceous reducing agent is molded by being filled into a predetermined container and the mixture-filled container is obtained as a mixture-molded body. In the oxide ore smelting method according to the present embodiment, the mixed-filled container thus obtained is subjected to a reduction treatment in a reducing furnace in a state in which the mixture is enclosed in the container.

[6-1. Mixture-Molding Step]

In the present embodiment, the oxide ore smelting method includes the container filling step S21b for molding the mixture obtained in the mixing treatment step S1 by filling the mixture into a predetermined container for reduction in the mixture-molding step S2 illustrated in FIG. 2. Here, the mixture-molding step S2 may include an arbitrary drying treatment step S22 for drying the mixture before and after the container filling step S21b. Incidentally, FIG. 2 illustrates a mode in which the drying treatment step S22 is performed after the container filling step S21b, and the mode is not limited thereto.

(1) Container Filling Step

The container filling step S21b is a step for molding the mixture obtained in the mixing treatment step S1 by supplying and filling the mixture into a container by using an apparatus such as an extruding machine to obtain a mixture-filled container as a mixture-molded body. It is possible to have uniform composition of the mixture and to produce ferronickel having small variations in the quality by filling the mixture into a container. In addition, it is possible to increase the production efficiency by filling the mixture into a container since the mixture is subjected to the reduction and heat treatment in a state of being filled in a container.

Incidentally, the container filling step S21$b$ may be performed after the mixture or the lump product is subjected to the drying treatment and the mixture or lump product after being dried may be filled into the container when filling the mixture or the lump product into a container.

Figure 10:
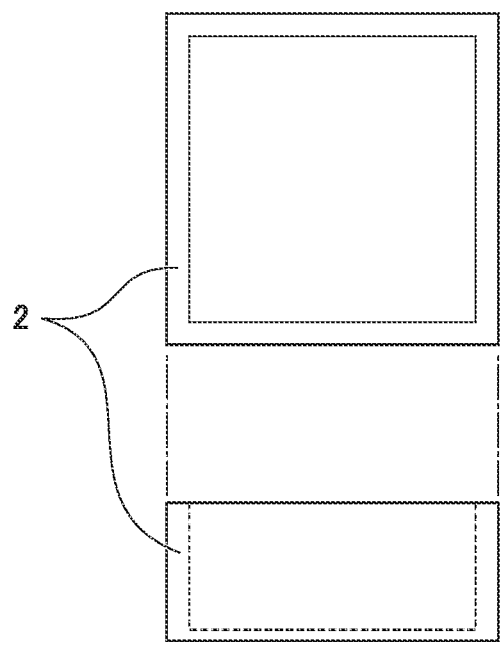
FIG. 10 is a top view and a side view which illustrate an example of a container having a rectangular parallelepiped shape in a sixth embodiment.

The container for reduction has a cavity portion for holding the mixture. Here, the shape of the cavity portion of the container is not particularly limited, but it is possible to use, for example, one having a rectangular parallelepiped shape or a cubic shape by a plane including the opening of the container and the inner wall surface. FIG. 10 is a top view and a side view which illustrate an example of the shape of the container. As illustrated in FIG. 10, a container 2 for reduction can be one having a rectangular parallelepiped shape. In addition, the container may be one having a cylindrical shape.

In addition, the size of the cavity portion of the container is not particularly limited, but it is preferable to use one in which the inner dimensions of the length and width of the plane when viewed from the upper surface are 50 mm or more and 1000 mm or less and the inner dimension of the height is 5 mm or more and 500 mm or less, for example, in the case of a rectangular parallelepiped shape as illustrated in FIG. 10. It is possible to perform smelting which causes small variations in the quality and exhibits high productivity by using a container having such a size.

In addition, the material of the container for reduction is not particularly limited, but it is preferable to use a container made of a material which does not adversely affect the mixture filled in the container at the time of the reduction treatment and can efficiently advance the reduction reaction. Specifically, a crucible made of graphite, a container made of ceramic or a metal, and the like can be used.

It is preferable to fill the mixture into the container so that a gap and a space are not formed between the mixture and the container, and it is preferable to compact the mixture by performing pressing and the like after filling. It is possible to increase the filling factor of the mixture in the container, to have uniform filling status of the mixture, and thus to further diminish variations in the quality of ferronickel by compacting and packing the mixture in the container in this manner.

As a method for filling the mixture into a container for reduction, the filling can be performed by sequentially supplying the mixture to the container by using an extruding machine or the like as described above. Upon filling, it is preferable to fill the mixture into the container at a high filling factor so that a gap and a space are not formed in the container. In addition, it is preferable to compact the mixture by performing pressing and the like after filling. It is possible to increase the filling factor of the mixture in the container, to have uniform filling status of the mixture, and thus to more efficiently produce ferronickel having small variations in the quality by compacting and filling the mixture into the container in this manner.

A lid may be put on the container filled with the mixture. The reduction reaction more efficiently proceeds and the metalation of nickel can be promoted particularly in a case in which a lid is put on the container and then the reduction and heat treatment (treatment in the reducing step S3) is performed. Incidentally, as the material of the lid, it is preferable to use the same material as that of the main body of the container. In addition, the container is not always required to be put in a sealed state even in the case of being provided with a lid.

The mixture-filled container obtained in the container filling step S21$b$ is subjected to the reducing step S3 to be described later in a state in which the mixture is filled in the container. As the mixture is filled into a container and subjected to a reduction treatment (treatment in the reducing step S3) in that state in this manner, a metal shell is formed on the surface of the mixture filled in the container, namely, the portion close to the container and the portion exposed to the atmosphere and then a metal is generated inside the shell. As a result, a relatively large ferronickel metal is generated and precipitates at the lower part in the metal shell, the metal can be easily separated and recovered by a treatment such as magnetic separation in the subsequent separating step S4, and this suppresses the loss and makes it possible to recover the ferronickel at a high recovery rate.

(2) Drying Treatment Step

The drying treatment step S22 is a step for drying the mixture at least before or after the container filling step S21$b$ described above. The details of the drying treatment step S22 are the same as the mode in the manufacturing method of the first embodiment.

Here, it is possible to subject the mixture to a drying treatment and to fill the mixture after being dried into the container when filling the mixture into a container. In addition, the mixture in a filled state may be subjected to a drying treatment after the mixture is filled into the container. It is possible to prevent the moisture from evaporating and expanding at a time by a sharp increase in the temperature at the time of the reduction treatment due to excess moisture in the mixture and the mixture filled in the container from being destroyed by subjecting the mixture to a drying treatment before the container filling step (after the mixing treatment step) or after the container filling step in this manner.

[6-2. Reducing Step]

In the reducing step S3, the mixture-filled container obtained in the container filling step S21$b$ is reduced and heated at a predetermined reducing temperature. The smelting reaction (reduction reaction) proceeds and a metal and slag are generated by the reduction and heat treatment of the mixture-filled container in this reducing step S3.

The reduction and heat treatment in the reducing step S3 is performed by using a reducing furnace or the like in the same manner as in the reducing step S3 in the first embodiment.

At this time, in the present embodiment, it is preferable to put a lid on the mixture-filled container and to charge the mixture-filled container in a state of having a lid thereon into a reducing furnace for treatment in the reduction and heat treatment. The reduction reaction more efficiently proceeds and the metalation of nickel can be promoted as a lid is put on the mixture-filled container and then the reduction and heat treatment is performed in this manner. Incidentally, it is preferable to use a lid made of the same material as that of the container.

In the present embodiment, a metal shell is formed on the surface of a relatively large mixture close to the size of the container and then a metal is generated inside the shell since the mixture is filled into a container for reduction and the mixture in a state of being filled in the container is subjected to a reduction and heat treatment. Moreover, a relatively large ferronickel metal is generated and precipitates at the lower part in the metal shell. In addition, the reduction reaction uniformly proceeds and ferronickel which does not have variations in the composition can be produced as the mixture is filled into a container. In addition, it is possible to recover the metal at a high recovery rate while suppressing the loss since the metal can be easily separated by a treatment such as magnetic separation.

Incidentally, the mixing treatment step S1 and the separating step S4 are the same as the modes in the manufacturing method of the first embodiment, and the detailed description thereon will be omitted.

7. Seventh Embodiment

In the oxide ore smelting method according to the seventh embodiment, raw materials including an oxide ore, which is a raw material ore, are mixed and kneaded, the mixture obtained by mixing and kneading is charged into a smelting furnace (reducing furnace) and subjected to a reduction treatment by heating.

[7-1. Mixing Treatment Step]

Figure 11:
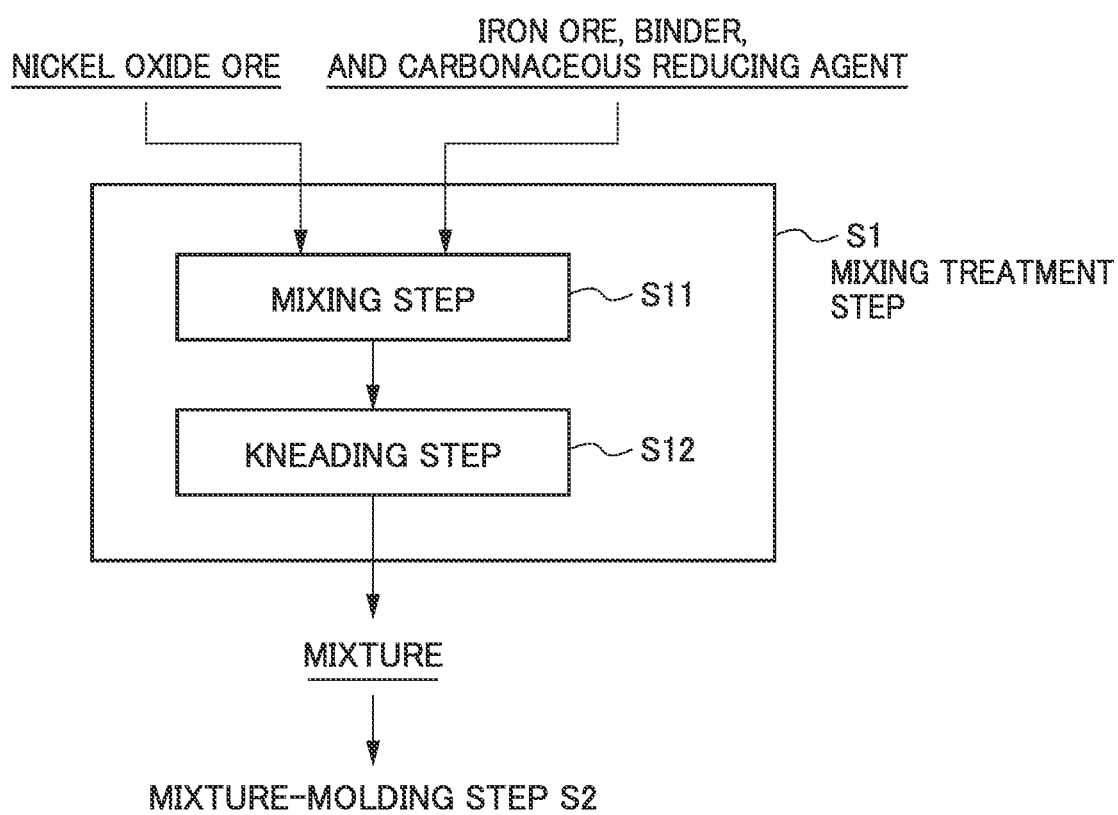
FIG. 11 is a treatment flowchart illustrating an example of the flow of treatments in a mixing treatment step in a seventh embodiment.

The mixing treatment step (mixing and kneading treatment step) S1 in the present embodiment is a step for mixing and kneading raw material powders including nickel oxide ore to obtain a mixture. FIG. 11 is a treatment flowchart illustrating the flow of treatments in the mixing treatment step S1. As illustrated in FIG. 11, the mixing treatment step S1 in the present embodiment includes a mixing step S11 for adding a carbonaceous reducing agent to nickel oxide ore, which is a raw material ore, and mixing these together and a kneading step S12 for kneading the mixture obtained.

(1) Mixing Step

The mixing step S11 is a step for mixing raw material powders including nickel oxide ore with other raw materials to obtain a mixture. A specific mode of the mixing step S11 is the same as the mode of the mixing treatment step S1 in the first embodiment, and the detailed description thereon will be omitted.

(2) Kneading Step

In the kneading step S12, the mixture obtained in the mixing step S1*l* is kneaded.

Here, a shear force is applied to the mixture at the time of kneading by kneading the mixture of raw material powders. Accordingly, the contact area between the particles constituting the mixture increases, the adhesive property of the respective particles can be enhanced, and the reduction reaction can easily take place in the reducing step S3 to be described later. This makes it possible to shorten the time required for the reduction reaction and thus to further enhance the productivity in the smelting of nickel oxide ore.

In addition, by the shear force to be applied by kneading the mixture of the raw material powders, it is possible to untangle the aggregation of the carbon reducing agent, the raw material powders and the like, to decrease the voids formed between the particles of the mixture, and to more uniformly advance the reduction reaction. This makes it possible to diminish variations in the quality after the reduction reaction and to fabricate high quality ferronickel.

The kneading in the kneading step S12 can be performed for the mixture obtained in the mixing step S1*l* by using a batch type kneading machine such as Brabender, a Banbury mixer, a Henschel mixer, a helical rotor, a roll, a single screw kneader, a twin-screw kneader, or the like. Here, the kneading may be performed by using a batch type kneading machine such as a kneader or a continuous kneading machine such as a twin-screw kneader.

In addition, the mixture may be extruded by using an extruding machine such as a single screw extruder or a twin-screw extruder as described above in addition to the kneading in the kneading step S12, and in this case, the extrusion can also serve as molding in the mixture-molding step S2 to be described later. It is possible to obtain a still higher kneading effect by extruding the mixture by using an extruding machine. In addition, the contact area between the particles constituting the mixture can be further increased and the voids formed between the particles of the mixture also decrease as a pressure is further applied to the mixture, and it is thus possible to efficiently fabricate still higher quality ferronickel.

[7-2. Mixture-Molding Step]

The mixture-molding step S2 is a step for molding the mixture of raw material powders obtained in the mixing treatment step S1 and drying the molded mixture if necessary to obtain a mixture-molded body such as a pellet. Incidentally, the mixture obtained in the mixing treatment step S1 may not be molded but may be used as a mixture-molded body as it is.

In the present embodiment, the oxide ore smelting method includes at least either of the lumping treatment step S21*a* for lumping (granulating) a mixture of raw materials including an oxide ore or the container filling step S21*b* for filling a mixture of raw materials including an oxide ore into a predetermined container for reduction in the mixture-molding step S2 illustrated in FIG. 2. Here, the mixture-molding step S2 may include an arbitrary drying treatment step S22 for drying the mixture after the lumping treatment step S21*a* and before and after the container filling step S21*b*. Incidentally, FIG. 3 illustrates a mode in which the drying treatment step S22 is performed after the lumping treatment step S21*a* and the container filling step S21*b*, and the mode is not limited thereto.

(1) Lumping Treatment Step

The lumping treatment step S21*a* is a step for lumping (granulating) the mixture of raw materials including an oxide ore obtained in the mixing treatment step S1 and obtaining a pellet having a predetermined shape and a predetermined size as a mixture-molded body.

The shape of pellet is not particularly limited, but the mixture can be molded into, for example, a cubic, rectangular parallelepiped, cylindrical or spherical shape. It is easy to mold the mixture into a pellet by molding the mixture into a cubic, rectangular parallelepiped, cylindrical or spherical shape, and it is thus possible to diminish the cost required for molding. In addition, it is possible to diminish the occurrence of defective molding since the shape to be molded is not complicated.

In the lumping treatment step S21*a*, moisture required for lumping can be added to the mixture if necessary and then the mixture can be molded into a pellet by using, for example, a lump product manufacturing apparatus in the same manner as in the second embodiment.

(2) Container Filling Step

Meanwhile, the container filling step S21*b* is a step for filling the mixture obtained in the mixing treatment step S1 or the pellet obtained in the lumping treatment step S21*a* into a predetermined container for reduction to obtain a mixture-filled container as a mixture-molded body. It is possible to more easily handle the mixture or pellet and to efficiently advance the reduction reaction by filling the mixture or pellet (hereinafter simply referred to as the "mixture" in some cases) into a container.

A specific mode of the container filling step S21b is the same as the mode of the container filling step S21b in the sixth embodiment, and the detailed description thereon will be omitted.

[7-3. Reducing Step]

In the reducing step S3, the mixture-molded body obtained in the mixture-molding step S2 is charged into a reducing furnace and reduced and heated at a predetermined reducing temperature. The smelting reaction (reduction reaction) proceeds and a metal and slag are generated by subjecting the mixture-molded body to a heat treatment in this manner.

The charging of the mixture-molded body into a reducing furnace can be performed by charging the mixture-molded body into a predetermined place into which the mixture-molded body is charged, for example, the hearth of the reducing furnace heated to a predetermined temperature. Here, one mixture-filled container or pellet, which is a mixture-molded body, may be charged or a plurality of smaller mixture-filled containers or pellets may be charged side by side. In addition, the pellets may be charged in two or more stages so as to overlap one another particularly in the case of charging the pellets into the reducing furnace.

Here, a carbonaceous reducing agent (hereinafter also referred to as the "hearth carbonaceous reducing agent") may be spread on the hearth of the reducing furnace in advance and the pellet may be placed on the spread hearth carbonaceous reducing agent particularly in the case of charging the pellets into the reducing furnace. In addition, after the mixture-molded body is charged into the reducing furnace, the mixture-molded body can be put into a state of being covered with the carbonaceous reducing agent. It is possible to rapidly advance the smelting reaction while suppressing the collapse of the pellet or the container contained in the mixture-filled container by performing the reduction and heat treatment in a state in which the pellet is charged in the reducing furnace in which the carbonaceous reducing agent is spread on the hearth or the charged mixture-molded body is surrounded with the carbonaceous reducing agent so as to be covered in this manner.

On the other hand, the mixture-molded body is heated from the surface and the reduction reaction proceeds from the vicinity of the surface toward the inside, and thus the hearth carbonaceous reducing agent may not be spread or the mixture-molded body may not be covered with the carbonaceous reducing agent. Particularly according to the present embodiment, it is possible to easily generate a metal shell on the surface regardless of the shape of the mixture-molded body by sufficiently performing kneading in the mixing treatment step S1. In addition, according to the present embodiment, the reaction uniformly takes place inside the mixture-molded body by sufficiently performing kneading in the mixing treatment step S1 and thus a metal shell may not be generated on the surface of the mixture-molded body.

The reduction and heat treatment of the mixture-molded body in the reducing step S3 is performed in the same manner as in the reducing step S3 in the first embodiment by using a reducing furnace or the like.

According to the method of the present embodiment, the oxide ore and the carbonaceous reducing agent are likely to come into contact with each other in a wider area as the reduction and heat treatment of the mixture-molded body obtained by kneading is performed. This makes it possible to easily advance the reduction reaction of an oxide ore using a carbonaceous reducing agent and thus to efficiently refine nickel oxide ore.

In addition, according to the method of the present embodiment, it is possible to perform the reduction and heat treatment of a mixture-molded body in which there is substantially no variation in the composition and the particles of raw materials are in close contact with one another and the reduction reaction is likely to uniformly take place by performing kneading. Hence, it is not required to bring uniformity by generating a metal shell on the surface of the mixture-molded body and conducting a reaction in the metal shell for a predetermined time as conventionally mentioned. Consequently, ferronickel can be fabricated by uniformly advancing the reduction reaction even without generating a metal shell on the surface of the mixture-molded body.

Incidentally, the drying treatment step S22 in the mixture-molding step S2 and the separating step S4 are the same as the modes in the manufacturing method of the first embodiment, and the detailed description thereon will be omitted.

EXAMPLES

Hereinafter, the present invention will be described more specifically with reference to Examples, but the present invention is not limited to the following Examples at all.

<<Evaluation Method>>

For the respective samples which were subjected to a reduction and heat treatment and obtained in the following Examples and Comparative Examples, the evaluation on the average particle diameter of the metal, the metallized rate of nickel, the nickel content rate in the metal, and the recovery rate of the nickel metal was performed by the following methods.

For the respective samples subjected to a reduction and heat treatment, the average particle diameter of the metal was measured by embedding a mixed product in which a metal and slag are separately generated after reduction into a resin and observing the metal deposited on the surface under a metallurgical microscope. Here, the average value of the longest lengths of the cross sections of 100 arbitrary metal particles deposited on each sample was taken as the average particle diameter.

In addition, for the respective samples after being subjected to the reduction and heat treatment, the metallized rate of nickel and the nickel content rate in the metal were analyzed by using an ICP emission spectroscopic analyzer (SHIMAZU S-8100 model) and calculated.

The metallized rate of nickel and the nickel content rate in the metal were calculated by the following equations.

(Metallized rate of nickel)=(amount of metallized Ni in mixture fed for reduction treatment)+(amount of entire Ni in mixture fed for reduction treatment)×100(%)

(Nickel content rate in metal)=(amount of metallized Ni in mixture fed for reduction treatment)+(total amount of metallized Ni and Fe in mixture fed for reduction treatment)×

100(%)

In addition, the respective samples after being subjected to the reduction and heat treatment were pulverized by wet treatment and then the metal was recovered therefrom by magnetic separation. Thereafter, the recovery rate of nickel metal was calculated from the content of nickel oxide ore in the pellet laminate charged into the reducing furnace, the nickel content rate in the nickel oxide ore, and the amount of nickel recovered.

The recovery rate of nickel metal was calculated by the following equation.

(Recovery rate of nickel metal)=(amount of recovered Ni)÷

(amount of oxide ore charged×Ni content rate in oxide ore)×

100(%)

Examples A1 to A9, Comparative Examples A1 to A3

[Production of Pellet]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 200 μm). The carbonaceous reducing agent was contained in an amount to be a proportion of 20% when the amount of the carbonaceous reducing agent required for reducing nickel oxide contained in the nickel oxide ore, which was a raw material ore, and iron oxide ($Fe_2O_3$) without excess or deficiency was taken as 100%.

Next, the mixture obtained was divided into samples of No. A1 to No. A12, and among these, the nine mixture samples of No. A1 to No. A9 were molded into a cylindrical shape by using a pellet molding apparatus in which a cutting machine was attached to the sample discharge port of a twin-screw type kneading machine. In addition, the cylindrical molded product was cut by using the cutting machine so as to have a disk shape having a circular cross section.

For the pellets obtained, the pellet yield after granulation (cutting) was calculated using the following Equation (2) based on the weight of the sample fed into the pellet molding apparatus and the weight of the disk-shaped pellets obtained.

Pellet yield after granulation (%)=weight of disk-shaped lump product÷weight of sample fed×100    Equation (2)

Meanwhile, the three mixture samples of No. A10 to No. A12 were granulated by using a pan type granulator. Specifically, the mixture of Sample A10 was granulated so that a spherical pellet having a diameter of from 10 mm to 13 mm was obtained, the mixture of Sample A11 was granulated so that a spherical pellet having a diameter of from 15 mm to 18 mm was obtained, and the mixture of Sample A12 was granulated so that a spherical pellet having a diameter of from 20 mm to 23 mm was obtained while adjusting the number of revolutions of the granulator and the amount of sample fed. Incidentally, classification was performed after granulation so that only a spherical pellet having a diameter of from 10 mm to 13 mm, a spherical pellet having a diameter of from 15 mm to 18 mm, and a spherical pellet having a diameter of from 20 mm to 23 mm were collected.

For the pellets obtained, the pellet yield after granulation was calculated using the following Equation (3) based on the weight of the sample fed into the pan type granulator and the weight of the spherical pellets obtained.

Pellet yield after granulation (%)=weight of spherical lump product after classification÷weight of sample fed×100    Equation (3)

Next, the pellets were subjected to a drying treatment in which hot air at from 300° C. to 400° C. was blown onto the pellets so that the pellets had a solid content of about 70% by weight and a water content of about 30% by weight, thereby producing 12 samples of No. A1 to No. A12. The composition (excluding carbon) of solid components in the pellets after being subjected to the drying treatment is presented in the following Table 3.

TABLE 3

| | Ni | $Fe_2O_3$ | $SiO_2$ | CaO | $Al_2O_3$ | MgO | Others |
|---|---|---|---|---|---|---|---|
| Composition of solid components in pellet after being dried [parts by weight] | 1.5 | 53.1 | 14.2 | 5.2 | 3.1 | 5.8 | Binder, carbonaceous reducing agent, and the like |

In the present Example, the treatment using the (disk-shape) pellet samples of No. A1 to No. A9 was referred to as Example A1 to Example A9 and the treatment using the (spherical) pellet samples of No. A10 to No. A12 was referred to as Comparative Example A1 to Comparative Example A3.

[Reduction and Heat Treatment of Pellet]

The pellets produced were charged into a reducing furnace and subjected to a reduction and heat treatment. Specifically, ash (containing $SiO_2$ as the main component and a small amount of oxides such as $Al_2O_3$ and MgO as other components) was spread on the hearth of the reducing furnace in advance and 1000 pellet samples were placed thereon. Incidentally, the disk-shaped pellets of No. A1 to No. A9 were stabilized and placed so that the circular surface (disk surface) faced downward and the circular surface and the hearth surface were parallel to each other.

Thereafter, a nitrogen atmosphere which substantially did not contain oxygen was set, and the pellets were charged into the reducing furnace. Incidentally, the temperature condition at the time of charging was set to 500±20° C.

Next, the reducing temperature was set to 1400° C., and the pellets were reduced and heated in the reducing furnace. The treatment time was set to 15 minutes so that a metal shell was generated on the surface of the pellet and the reduction in the pellet efficiently proceeded. After the reduction treatment, the sample was rapidly cooled to room temperature in the nitrogen atmosphere and then taken out into the air.

After the spherical pellets of 12 samples of No. A1 to No. A12 were subjected to the same reduction and heat treatment, the presence or absence of "breaking", "collapse", "chipping of a quarter or more of pellet volume", "generation of large cracks with a gap of 1 mm or more" in each pellet was judged, and a pellet sample having any one or more defects was judged to be "poor". Meanwhile, a pellet sample which was cleanly subjected to the reduction treatment without such defective sites was judged as "qualified product". Incidentally, the yield (%) after the reduction treatment was calculated by dividing the number of qualified products by the number of pellets fed (1000 pieces).

The aspect ratio, the diameter of spherical pellets, and the pellet yields after granulation and after the reduction treatment in each pellet sample are presented in the following Table 4. In addition, the measurement results acquired by ICP analysis are presented.

TABLE 4

| Sample No. | Aspect ratio of disk-shaped pellet | Diameter of spherical pellet [mm] | Pellet yield [%] After granulation | Pellet yield [%] After reduction treatment | Metallized rate of nickel [%] | Ni content in metal [%] |
|---|---|---|---|---|---|---|
| Example A1 | 0.2 | — | 96.0 | 99.0 | 95.0 | 19.0 |
| Example A2 | 2.0 | — | 96.1 | 99.3 | 95.1 | 19.2 |
| Example A3 | 2.5 | — | 96.4 | 99.2 | 95.3 | 19.1 |
| Example A4 | 0.4 | — | 97.0 | 99.5 | 96.0 | 20.0 |
| Example A5 | 1.6 | — | 97.3 | 99.6 | 96.7 | 20.3 |
| Example A6 | 1.9 | — | 97.2 | 99.4 | 96.5 | 20.2 |
| Example A7 | 0.4 | — | 98.0 | 99.8 | 98.0 | 21.0 |
| Example A8 | 1.0 | — | 98.1 | 99.9 | 98.3 | 21.4 |
| Example A9 | 1.4 | — | 98.4 | 99.9 | 98.2 | 21.2 |
| Comparative Example A1 | — | 10~13 | 78.5 | 93.1 | 94.3 | 17.4 |
| Comparative Example A2 | — | 15~18 | 81.2 | 95.6 | 94.6 | 18.1 |
| Comparative Example A3 | — | 20~23 | 76.2 | 88.5 | 90.6 | 18.8 |

As presented in the results of Table 4, it has been found that it is possible to favorably metallize nickel in the pellet and to produce high grade ferronickel having a nickel content of from 19.0% to 21.4% as disk-shaped pellets are produced and a reduction and heat treatment is performed using the pellets (Example A1 to Example A9). In addition, such disc-shaped pellets were stable without rolling even when the reducing furnace vibrated at the time of the reduction and heat treatment.

It is considered that the reason why favorable ferronickel can be produced in this manner is because a metal shell is uniformly and stably generated as a disk-shaped pellet is used and a reduction reaction uniformly and stably takes place without leakage of the reducing agent in the metal shell by this.

In contrast, as presented in the results for Comparative Example A1 to Comparative Example A3, the metallized rate of nickel was low on the average and the nickel content in the metal was also from 17.4% to 18.8% to be a low value as ferronickel in the case of spherical pellets as compared with the disk-shaped pellet samples used in Examples.

Examples B1 to B24, Comparative Examples B1 to B8

[Mixing of Raw Material Powder]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 190 μm) by using a mixing machine while adding an appropriate amount of water thereto. The carbonaceous reducing agent was contained in an amount to be a proportion of 25.0% when the amount of the carbonaceous reducing agent required for reducing nickel oxide contained in the nickel oxide ore, which was a raw material ore, and iron oxide ($Fe_2O_3$) without excess or deficiency was taken as 100%.

[Molding of Mixture]

Next, samples having the volumes presented in Table 5 and Table 6 were divided from the mixture obtained by the number corresponding to the number of laminated layers of each sample, and each sample was molded into a predetermined shape to obtain a pellet. Specifically, the samples of Examples B1 to B6 and B13 to B18 and Comparative Examples B1, B2, B5 and B6 were molded into rectangular parallelepiped shapes having sizes presented in Table 4 and Table 5 and the samples of Examples B7 to B12 and B19 to B24 and Comparative Examples B3, B4, B7 and B8 were molded into cylindrical shapes having sizes presented in Table 4 and Table 5 by using a compression molding machine.

Next, each of the samples was subjected to a drying treatment in which hot air at from 200° C. to 250° C. was blown onto the sample so that the sample had a solid content of about 70% by weight and a water content of about 30% by weight. The composition of solid components (excluding carbon) in the pellets after being subjected to the drying treatment was about the same as those in Examples A1 to A9.

[Reduction and Heat Treatment of Pellet]

The pellets after being subjected to the drying treatment were each charged into a reducing furnace set to a nitrogen atmosphere which substantially did not contain oxygen. Incidentally, the temperature condition in the reducing furnace at the time of charging was set to 500±20° C.

Next, the pellets were subjected to a reduction and heat treatment at the temperature and time presented in Table 5 and Table 6. After the reduction treatment, the sample was rapidly cooled to room temperature in the nitrogen atmosphere and then taken out into the air.

Here, charging of the pellets into the reducing furnace was performed by spreading ash (containing $SiO_2$ as the main component and a small amount of oxides such as $Al_2O_3$ and MgO as other components) on the hearth of the reducing furnace in advance and placing the pellets thereon. In addition, the pellet laminates were formed by laminating pellets so as to be in two stages in the height direction as illustrated in FIG. 6 in Examples B1 to B3, B7 to B9, B13 to B15, and B19 to B21 and laminating pellets so as to be in three stages in the height direction in Examples B4 to B6, B10 to B12, B16 to B18, and B22 to B24. On the other hand, in Comparative Example B1 to Comparative Example B8, the pellets were placed on the hearth of the reducing furnace so as to be in one stage in the height direction, that is, without being laminated.

The average particle diameter of nickel metal, the metallized rate of nickel, the nickel content rate in the metal, and the recovery rate of nickel metal in Examples B1 to B24 and Comparative Examples B1 to B8 are presented in the following Table 5 and Table 6.

TABLE 5

| Sample No. | Pellet laminate | | | Reducing temperature [° C.] | Reducing time [min] | Average particle diameter of metal [μm] | Metallized rate of Ni [%] | Ni content in metal [%] | Recovery rate of Ni metal [%] |
| --- | --- | --- | --- | --- | --- | --- | --- | --- | --- |
| | Shape | Volume [mm$^2$] | Number of stages laminated | | | | | | |
| Example B1 | Rectangular parallelepiped having length of 30 mm for each side and height of 10 mm | 9,000 | 2 | 1,300 | 35 | 4.0 | 97.2 | 19.0 | 91.2 |
| Example B2 | Rectangular parallelepiped having length of 30 mm for each side and height of 15 mm | 13,500 | 2 | 1,300 | 35 | 5.1 | 97.3 | 19.3 | 92.1 |
| Example B3 | Rectangular parallelepiped having length of 30 mm for each side and height of 20 mm | 18,000 | 2 | 1,300 | 35 | 6.2 | 97.6 | 19.4 | 93.3 |
| Example B4 | Rectangular parallelepiped having length of 30 mm for each side and height of 10 mm | 9,000 | 3 | 1,300 | 35 | 4.1 | 97.4 | 19.8 | 91.3 |
| Example B5 | Rectangular parallelepiped having length of 30 mm for each side and height of 15 mm | 13,500 | 3 | 1,300 | 35 | 4.9 | 97.8 | 19.5 | 92.3 |
| Example B6 | Rectangular parallelepiped having length of 30 mm for each side and height of 20 mm | 18,000 | 3 | 1,300 | 35 | 6.1 | 97.2 | 19.2 | 93.5 |
| Example B7 | Cylinder having diameter of 30 mm and height of 12 mm | 8,478 | 2 | 1,300 | 35 | 4.3 | 97.3 | 19.1 | 91.6 |
| Example B8 | Cylinder having diameter of 30 mm and height of 15 mm | 10,598 | 2 | 1,300 | 35 | 5.0 | 97.8 | 19.5 | 92.1 |
| Example B9 | Cylinder having diameter of 30 mm and height of 18 mm | 12,717 | 2 | 1,300 | 35 | 5.7 | 97.2 | 19.7 | 92.8 |
| Example B10 | Cylinder having diameter of 30 mm and height of 12 mm | 8,478 | 3 | 1,300 | 35 | 4.4 | 97.7 | 19.8 | 91.5 |
| Example B11 | Cylinder having diameter of 30 mm and height of 15 mm | 10,598 | 3 | 1,300 | 35 | 5.1 | 97.6 | 19.3 | 92.3 |
| Example B12 | Cylinder having diameter of 30 mm and height of 18 mm | 12,717 | 3 | 1,300 | 35 | 5.8 | 97.5 | 19.6 | 92.8 |
| Example B13 | Rectangular parallelepiped having length of 30 mm for each side and height of 10 mm | 9,000 | 2 | 1,400 | 15 | 4.1 | 97.2 | 19.3 | 91.1 |
| Example B14 | Rectangular parallelepiped having length of 30 mm for each side and height of 15 mm | 13,500 | 2 | 1,400 | 15 | 5.3 | 97.8 | 19.6 | 92.3 |

TABLE 5-continued

| Sample No. | Pellet laminate Shape | Volume [mm²] | Number of stages laminated | Reducing temperature [° C.] | Reducing time [min] | Average particle diameter of metal [μm] | Metallized rate of Ni [%] | Ni content in metal [%] | Recovery rate of Ni metal [%] |
|---|---|---|---|---|---|---|---|---|---|
| Example B15 | Rectangular parallelepiped having length of 30 mm for each side and height of 20 mm | 18,000 | 2 | 1,400 | 15 | 6.2 | 97.8 | 19.9 | 93.4 |
| Example B16 | Rectangular parallelepiped having length of 30 mm for each side and height of 10 mm | 9,000 | 3 | 1,400 | 15 | 3.9 | 97.7 | 19.5 | 91.0 |
| Example B17 | Rectangular parallelepiped having length of 30 mm for each side and height of 15 mm | 13,500 | 3 | 1,400 | 15 | 4.8 | 97.8 | 19.3 | 92.3 |
| Example B18 | Rectangular parallelepiped having length of 30 mm for each side and height of 20 mm | 18,000 | 3 | 1,400 | 15 | 6.1 | 97.5 | 19.8 | 93.3 |

TABLE 6

| Sample No. | Pellet laminate Shape | Volume [mm²] | Number of stages laminated | Reducing temperature [° C.] | Reducing time [min] | Average particle diameter of metal [μm] | Metallized rate of Ni [%] | Ni content in metal [%] | Recovery rate of Ni metal [%] |
|---|---|---|---|---|---|---|---|---|---|
| Example B19 | Cylinder having diameter of 30 mm and height of 12 mm | 8,478 | 2 | 1,400 | 15 | 4.3 | 97.3 | 19.8 | 91.7 |
| Example B20 | Cylinder having diameter of 30 mm and height of 15 mm | 10,598 | 2 | 1,400 | 15 | 5.3 | 97.7 | 19.2 | 92.0 |
| Example B21 | Cylinder having diameter of 30 mm and height of 18 mm | 12,717 | 2 | 1,400 | 15 | 5.7 | 97.8 | 19.9 | 92.9 |
| Example B22 | Cylinder having diameter of 30 mm and height of 12 mm | 8,478 | 3 | 1,400 | 15 | 4.5 | 97.6 | 19.3 | 91.5 |
| Example B23 | Cylinder having diameter of 30 mm and height of 15 mm | 10,598 | 3 | 1,400 | 15 | 5.2 | 97.5 | 19.7 | 92.4 |
| Example B24 | Cylinder having diameter of 30 mm and height of 18 mm | 12,717 | 3 | 1,400 | 15 | 5.8 | 97.9 | 19.7 | 93.0 |
| Comparative Example B1 | Rectangular parallelepiped having length of 30 mm for each side and height of 5 mm | 4,500 | 1 | 1,300 | 35 | 2.1 | 86.3 | 16.0 | 82.1 |
| Comparative Example B2 | Rectangular parallelepiped having length of 30 mm for each side and height of 9 mm | 8,100 | 1 | 1,300 | 35 | 3.2 | 88.4 | 16.5 | 83.8 |
| Comparative Example B3 | Cylinder having diameter of 30 mm and height of 7 mm | 4,946 | 1 | 1,300 | 35 | 2.5 | 87.6 | 16.2 | 82.4 |
| Comparative Example B4 | Cylinder having diameter of 30 mm and height of 12 mm | 8,478 | 1 | 1,300 | 35 | 3.8 | 89.5 | 16.8 | 84.2 |
| Comparative Example B5 | Rectangular parallelepiped having length of 30 mm for each side and height of 5 mm | 4,500 | 1 | 1,400 | 15 | 2.2 | 86.1 | 16.1 | 82.3 |

TABLE 6-continued

| Sample No. | Pellet laminate Shape | Volume [mm²] | Number of stages laminated | Reducing temperature [° C.] | Reducing time [min] | Average particle diameter of metal [μm] | Metallized rate of Ni [%] | Ni content in metal [%] | Recovery rate of Ni metal [%] |
|---|---|---|---|---|---|---|---|---|---|
| Comparative Example B6 | Rectangular parallelepiped having length of 30 mm for each side and height of 9 mm | 8,100 | 1 | 1,400 | 15 | 3.2 | 88.5 | 16.4 | 83.7 |
| Comparative Example B7 | Cylinder having diameter of 30 mm and height of 7 mm | 4,946 | 1 | 1,400 | 15 | 2.6 | 87.8 | 16.2 | 82.5 |
| Comparative Example B8 | Cylinder having diameter of 30 mm and height of 12 mm | 8,478 | 1 | 1,400 | 15 | 4.0 | 89.6 | 16.7 | 84.3 |

As presented in the results of Table 5 and Table 6, it has been found that it is possible to produce high grade ferronickel having a high metallized rate of nickel of 97.2% or more and a high nickel content in the metal of 19.0% or more as a pellet laminate is formed by laminating pellets in two or more stages in the height direction and subjected to a reduction treatment (Example B1 to Example B24). In these Examples, it has been found that the recovery rate of metal from the pellet laminate is also as high as 91.1% or more. In addition, with regard to the average particle diameter of metal, it has been found that the particles grow larger as the thickness of the pellet before being laminated is thicker (height is higher).

It is considered that the reason why high grade ferronickel can be produced in this manner is because a great amount of metal is present, thus the metal easily aggregates, and large particles are obtained as the throughput in the reduction treatment can be greatly increased and the apparent volume of the pellets is increased as a whole by laminating the pellets. As a result, it is considered that a high value of recovery rate of metal is also obtained.

In contrast, as presented in the results for Comparative Example B1 to Comparative Example B8, the metallized rate of nickel is 89.6% at the highest, the nickel content in the metal is 16.8% at the highest, and the recovery rate of metal is 84.3% at the highest in a case in which the pellets are subjected to a reduction treatment without being laminated, and these are all lower values as compared with those in Examples.

Examples C1 to C24, Comparative Examples C1 to C4

[Mixing of Raw Material Powder]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 200 μm) by using a mixing machine while adding an appropriate amount of water thereto. The carbonaceous reducing agent was contained in an amount to be a proportion of 28.0% when the amount of the carbonaceous reducing agent required for reducing nickel oxide contained in the nickel oxide ore, which was a raw material ore, and iron oxide ($Fe_2O_3$) without excess or deficiency was taken as 100%.

[Molding of Mixture]

Next, 28 samples were divided from the mixture obtained and molded into the shapes presented in Table 7. Specifically, the mixture was molded into pellets by using a compression molding machine so as to have predetermined thicknesses. Incidentally, for the samples of Example C21 to Example C24, the pellets were deliberately mechanically vibrated to form fissures and breaks on the surface thereof.

Next, each of the samples of Example C1 to Example C28 and Comparative Example C1 to Comparative Example C4 was subjected to a drying treatment in which hot air at from 300° C. to 400° C. was blown onto the sample so that the sample had a solid content of about 70% by weight and a water content of about 30% by weight. The composition of solid components (excluding carbon) in the pellets after being subjected to the drying treatment was about the same as those in Examples A1 to A9.

[Reduction and Heat Treatment of Mixture]

The pellets after being subjected to the drying treatment were each charged into a reducing furnace set to a nitrogen atmosphere which substantially did not contain oxygen. Incidentally, the temperature condition at the time of charging into the reducing furnace was set to 500±20° C.

Next, the pellets were subjected to a reduction and heat treatment at the temperature and time presented in Table 7. After the reduction treatment, the sample was rapidly cooled to room temperature in the nitrogen atmosphere and then taken out into the air.

Here, charging of the pellets into the reducing furnace was performed by spreading ash (containing $SiO_2$ as the main component and a small amount of oxides such as $Al_2O_3$ and MgO as other components) on the hearth of the reducing furnace in advance and placing the pellets thereon.

In the present Example, the treatments in which pellets having a thickness (height) of 17 mm or more were charged into a reducing furnace were denoted as Example C1 to Example C24 and the treatments in which pellets having a thickness (height) of less than 17 mm were charged into a reducing furnace were denoted as Comparative Example C1 to Comparative Example C4.

The average particle diameter of nickel metal, the metallized rate of nickel, the nickel content rate in the metal, and the recovery rate of nickel metal in Examples C1 to C24 and Comparative Examples C1 to C8 are presented in the following Table 7.

TABLE 7

| Sample | Pellet Shape | Pellet Size (length and width) | Pellet Size (height) | Reducing temperature [° C.] | Reducing time [min] | Average particle diameter of metal [μm] | Metallized rate of Ni [%] | Ni content in metal [%] | Recovery rate of Ni metal [%] |
|---|---|---|---|---|---|---|---|---|---|
| Example C1 | Cylinder | Diameter 300 mm | 18 mm | 1300 | 35 | 5.2 | 97.0 | 18.8 | 91.0 |
| Example C2 | Cylinder | Diameter 300 mm | 25 mm | 1300 | 35 | 17.6 | 97.2 | 19.2 | 91.8 |
| Example C3 | Cylinder | Diameter 300 mm | 80 mm | 1300 | 35 | 95.3 | 97.5 | 19.7 | 93.1 |
| Example C4 | Cylinder | Diameter 300 mm | 300 mm | 1300 | 35 | 205 | 97.4 | 19.6 | 94.2 |
| Example C5 | Cylinder | Diameter 300 mm | 500 mm | 1300 | 35 | 283 | 97.7 | 19.8 | 95.0 |
| Example C6 | Rectangular parallelepiped | 400 mm × 400 mm | 18 mm | 1300 | 35 | 5.1 | 96.9 | 19.0 | 91.3 |
| Example C7 | Rectangular parallelepiped | 400 mm × 400 mm | 25 mm | 1300 | 35 | 17.3 | 97.1 | 19.3 | 92.4 |
| Example C8 | Rectangular parallelepiped | 400 mm × 400 mm | 80 mm | 1300 | 35 | 93.8 | 97.4 | 19.8 | 93.2 |
| Example C9 | Rectangular parallelepiped | 400 mm × 400 mm | 300 mm | 1300 | 35 | 203 | 97.7 | 19.8 | 94.5 |
| Example C10 | Rectangular parallelepiped | 400 mm × 400 mm | 500 mm | 1300 | 35 | 276 | 97.8 | 19.8 | 95.3 |
| Example C11 | Cylinder | Diameter 300 mm | 18 mm | 1400 | 15 | 5.5 | 96.8 | 19.2 | 91.1 |
| Example C12 | Cylinder | Diameter 300 mm | 25 mm | 1400 | 15 | 17.8 | 97.0 | 19.1 | 92.0 |
| Example C13 | Cylinder | Diameter 300 mm | 80 mm | 1400 | 15 | 96.2 | 97.6 | 19.7 | 93.2 |
| Example C14 | Cylinder | Diameter 300 mm | 300 mm | 1400 | 15 | 207 | 97.5 | 19.8 | 94.5 |
| Example C15 | Cylinder | Diameter 300 mm | 500 mm | 1400 | 15 | 285 | 97.7 | 19.9 | 95.3 |
| Example C16 | Rectangular parallelepiped | 400 mm × 400 mm | 18 mm | 1400 | 15 | 5.0 | 97.1 | 18.7 | 91.5 |
| Example C17 | Rectangular parallelepiped | 400 mm × 400 mm | 25 mm | 1400 | 15 | 17.1 | 97.3 | 19.1 | 92.6 |
| Example C18 | Rectangular parallelepiped | 400 mm × 400 mm | 80 mm | 1400 | 15 | 94.7 | 97.6 | 19.6 | 93.9 |
| Example C19 | Rectangular parallelepiped | 400 mm × 400 mm | 300 mm | 1400 | 15 | 201 | 97.5 | 19.6 | 94.7 |
| Example C20 | Rectangular parallelepiped | 400 mm × 400 mm | 500 mm | 1400 | 15 | 278 | 97.9 | 19.9 | 95.7 |
| Example C21 | Cylinder (*1) | Diameter 300 mm | 80 mm | 1300 | 35 | 95.5 | 97.3 | 19.5 | 93.2 |
| Example C22 | Rectangular parallelepiped (*1) | 400 mm × 400 mm | 80 mm | 1300 | 35 | 93.7 | 97.6 | 19.7 | 93.1 |
| Example C23 | Cylinder (*1) | Diameter 300 mm | 80 mm | 1400 | 15 | 96.1 | 97.7 | 19.8 | 93.3 |
| Example C24 | Rectangular parallelepiped (*1) | 400 mm × 400 mm | 80 mm | 1400 | 15 | 94.8 | 97.8 | 19.7 | 94.0 |
| Comparative Example C1 | Cylinder | Diameter 300 mm | 3 mm | 1300 | 35 | 2.0 | 90.3 | 16.3 | 80.3 |
| Comparative Example C2 | Cylinder | Diameter 300 mm | 3 mm | 1300 | 35 | 2.2 | 89.5 | 16.1 | 81.5 |
| Comparative Example C3 | Rectangular parallelepiped | 400 mm × 400 mm | 3 mm | 1400 | 15 | 1.9 | 89.6 | 16.2 | 79.6 |
| Comparative Example C4 | Rectangular parallelepiped | 400 mm × 400 mm | 3 mm | 1400 | 15 | 1.8 | 88.3 | 16.0 | 78.8 |

(*1): It indicates that it is an example in which fissures and breaks are formed at least on the surface.

As presented in the results of Table 7, it has been found that it is possible to produce high grade ferronickel having a high metallized rate of nickel of 96.9% or more and a high nickel content in the metal of 18.8% or more as pellets molded so as to have a thickness (height) of 17 mm or more are charged into a reducing furnace and subjected to a reduction treatment (Example C1 to Example C24). In these Examples, it has been found that the recovery rate of metal from the pellet is also as high as 91.0% or more. In addition, with regard to the average particle diameter of metal, it has been found that the particles grow larger as the thickness of the pellet is thicker (height is higher).

It is considered that the reason why high grade ferronickel can be produced in this manner is because a greater amount of metal is generated, thus the metal easily aggregates in the pellet, and large metal particles are obtained as the thickness of the pellet is increased to a predetermined thickness or more. As a result, it is considered that a high value of recovery rate of metal is also obtained.

In addition, from the favorable results obtained for Examples C21 to C24 in which fissures and breaks are formed on the surface, it is considered that the grade of ferronickel and the recovery rate of metal are slightly affected even when fissures and breaks are formed on the pellet before being reduced to some extent although it is considered that the influence depends on the extent.

In contrast, as presented in the results for Comparative Example C1 to Comparative Example C4, the metallized rate of nickel is 90.3% at the highest, the nickel content in the metal is 16.3% at the highest, and the recovery rate of metal is 81.5% at the highest in a case in which pellets molded so as to have a thickness (height) of less than 17 mm are charged into a reducing furnace and subjected to a reduction treatment, and these are all lower values as compared with those in Examples.

Examples D1 to D20, Comparative Examples D1 to D4

[Mixing of Raw Material Powder]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 180 μm) by using a mixing machine while adding an appropriate amount of water thereto. The carbonaceous reducing agent was contained in an amount to be a proportion of 27.0% when the amount of the carbonaceous reducing agent required for reducing nickel oxide contained in the nickel oxide ore, which was a raw material ore, and iron oxide ($Fe_2O_3$) without excess or deficiency was taken as 100%.

[Molding of Mixture]

Next, 24 samples were divided from the mixture obtained and molded into the shapes presented in Table 8. Among these, for the samples of Examples D1 to D3 and D11 to D13 and Comparative Examples D1 and D2, the mixture was molded into spherical pellets having predetermined diameters by using a pan type granulator. In addition, for Examples D4 to D10 and D14 to D20 and Comparative Examples D3 and D4, the mixture was molded into pellets having a cylindrical, rectangular parallelepiped or cubic shape by using a compression molding machine.

Next, each of the samples of Examples D1 to D20 and Comparative Example D1 to D4 was subjected to a drying treatment in which hot air at from 300° C. to 400° C. was blown onto the sample so that the sample had a solid content of about 70% by weight and a water content of about 30% by weight. The composition of solid components (excluding carbon) in the pellets after being subjected to the drying treatment was about the same as those in Examples A1 to A9.

[Reduction and Heat Treatment of Pellet]

The pellets after being subjected to the drying treatment were subjected to a reduction and heat treatment at the temperature and time presented in Table 8 in the same manner as in Examples C1 to C24 and Comparative Examples C1 to C8. After the reduction treatment, the sample was rapidly cooled to room temperature in the nitrogen atmosphere and then taken out into the air.

In the present Example, the treatments in which pellets having a shortest length from the center to the surface of 10 mm or more were charged into a reducing furnace were denoted as Example D1 to Example D20 and the treatments in which pellets having a shortest length from the center to the surface of less than 10 mm were charged into a reducing furnace were denoted as Comparative Example D1 to Comparative Example D4.

The average particle diameter of nickel metal, the metallized rate of nickel, the nickel content rate in the metal, and the recovery rate of nickel metal in each sample are presented in the following Table 8.

TABLE 8

| Sample | Pellet Shape | Size | Shortest distance from center to surface [mm] | Reducing temperature [° C.] | Reducing time [min] | Average particle diameter of metal [μm] | Metallized rate of Ni [%] | Ni content in metal [%] | Recovery rate of Ni metal [%] |
|---|---|---|---|---|---|---|---|---|---|
| Example D1 | Sphere | Diameter 21 mm | 10.5 | 1300 | 35 | 5.4 | 97.1 | 19.0 | 91.2 |
| Example D2 | Sphere | Diameter 36 mm | 18 | 1300 | 35 | 20.3 | 97.3 | 19.2 | 92.1 |
| Example D3 | Sphere | Diameter 50 mm | 25 | 1300 | 35 | 43.8 | 97.5 | 19.5 | 93.3 |
| Example D4 | Cylinder | Diameter 70 mm × height 70 mm | 35 | 1300 | 35 | 87.5 | 97.5 | 19.7 | 94.2 |
| Example D5 | Cylinder | Diameter 100 mm × height 100 mm | 50 | 1300 | 35 | 112 | 97.8 | 19.8 | 95.1 |
| Example D6 | Rectangular parallelepiped | Length 50 mm × width 50 mm × height 21 mm | 10.5 | 1300 | 35 | 5.3 | 97.0 | 19.1 | 91.0 |
| Example D7 | Rectangular parallelepiped | Length 50 mm × width 50 mm × height 36 mm | 18 | 1300 | 35 | 20.4 | 97.2 | 19.3 | 92.2 |
| Example D8 | Cube | Length 50 mm × width 50 mm × height 50 mm | 25 | 1300 | 35 | 43.5 | 97.4 | 19.4 | 93.1 |
| Example D9 | Rectangular parallelepiped | Length 50 mm × width 50 mm × height 70 mm | 25 | 1300 | 35 | 87.3 | 97.5 | 19.6 | 94.3 |
| Example D10 | Rectangular parallelepiped | Length 50 mm × width 50 mm × height 100 mm | 25 | 1300 | 35 | 109 | 97.7 | 19.8 | 94.8 |
| Example D11 | Sphere | Diameter 21 mm | 10.5 | 1400 | 15 | 5.1 | 97.2 | 19.2 | 91.1 |
| Example D12 | Sphere | Diameter 36 mm | 18 | 1400 | 15 | 20.1 | 97.3 | 19.2 | 91.9 |
| Example D13 | Sphere | Diameter 50 mm | 25 | 1400 | 15 | 43.2 | 97.6 | 19.5 | 92.8 |
| Example D14 | Cylinder | Diameter 70 mm × height 70 mm | 35 | 1400 | 15 | 87.7 | 97.6 | 19.6 | 94.0 |

TABLE 8-continued

| Sample | Pellet Shape | Size | Shortest distance from center to surface [mm] | Reducing temperature [° C.] | Reducing time [min] | Average particle diameter of metal [μm] | Metallized rate of Ni [%] | Ni content in metal [%] | Recovery rate of Ni metal [%] |
|---|---|---|---|---|---|---|---|---|---|
| Example D15 | Cylinder | Diameter 100 mm × height 100 mm | 50 | 1400 | 15 | 114 | 97.8 | 19.9 | 95.3 |
| Example D16 | Rectangular parallelepiped | Length 50 mm × width 50 mm × height 21 mm | 10.5 | 1400 | 15 | 5.5 | 97.2 | 19.1 | 91.3 |
| Example D17 | Rectangular parallelepiped | Length 50 mm × width 50 mm × height 36 mm | 18 | 1400 | 15 | 20.6 | 97.4 | 19.4 | 92.4 |
| Example D18 | Cube | Length 50 mm × width 50 mm × height 50 mm | 25 | 1400 | 15 | 44.1 | 97.5 | 19.5 | 93.6 |
| Example D19 | Rectangular parallelepiped | Length 50 mm × width 50 mm × height 70 mm | 25 | 1400 | 15 | 88.3 | 97.7 | 19.6 | 94.5 |
| Example D20 | Rectangular parallelepiped | Length 50 mm × width 50 mm × height 100 mm | 25 | 1400 | 15 | 116 | 97.9 | 19.7 | 95.2 |
| Comparative Example D1 | Sphere | Diameter 8 mm | 4 | 1300 | 35 | 2.5 | 90.1 | 16.2 | 82.1 |
| Comparative Example D2 | Sphere | Diameter 8 mm | 4 | 1300 | 35 | 2.7 | 89.7 | 16.0 | 81.8 |
| Comparative Example D3 | Rectangular parallelepiped | Length 50 mm × width 50 mm × height 5 mm | 2.5 | 1400 | 15 | 3.1 | 88.7 | 16.3 | 83.4 |
| Comparative Example D4 | Rectangular parallelepiped | Length 50 mm × width 50 mm × height 5 mm | 2.5 | 1400 | 15 | 3.2 | 89.5 | 16.4 | 83.8 |

As presented in the results of Table 8, it has been found that it is possible to produce high grade ferronickel having a high metallized rate of nickel of 97.0% or more and a high nickel content in the metal of 19.0% or more as pellets molded so as to have a shortest length from the center to the surface of 10.0 mm or more are charged into a reducing furnace and subjected to a reduction treatment (Example D1 to Example D20). In these Examples, it has been found that the recovery rate of metal from the mixture is also as high as 91.0% or more. In addition, with regard to the average particle diameter of metal, it has been found that the particles grow larger as the shortest length from the center to the surface of the pellet is longer.

It is considered that the reason why high grade ferronickel can be produced in this manner is because a greater amount of metal is generated, thus the metal easily aggregates in the pellet, and large metal particles are obtained as the size of the pellet to be charged into the reducing furnace is increased by increasing the shortest length from the center to the surface of the pellet to a predetermined length or more. As a result, it is considered that a high value of recovery rate of metal is also obtained.

In contrast, as presented in the results for Comparative Example D1 to Comparative Example D4, the metallized rate of nickel is 90.1% at the highest, the nickel content in the metal is 16.0% at the highest, and the recovery rate of metal is 83.8% at the highest in a case in which pellets molded so as to have a shortest length from the center to the surface of 10.0 mm or more are charged into a reducing furnace and subjected to a reduction treatment, and these are all lower values as compared with those in Examples.

Examples E1 to E3, Comparative Examples E1 to E3

[Mixing of Raw Material Powder]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 190 μm) by using a mixing machine while adding an appropriate amount of water thereto. The carbonaceous reducing agent was contained in an amount to be a proportion of 26.0% when the amount of the carbonaceous reducing agent required for reducing nickel oxide contained in the nickel oxide ore, which was a raw material ore, and iron oxide ($Fe_2O_3$) without excess or deficiency was taken as 100%.

[Molding of Mixture]

Figure 12:
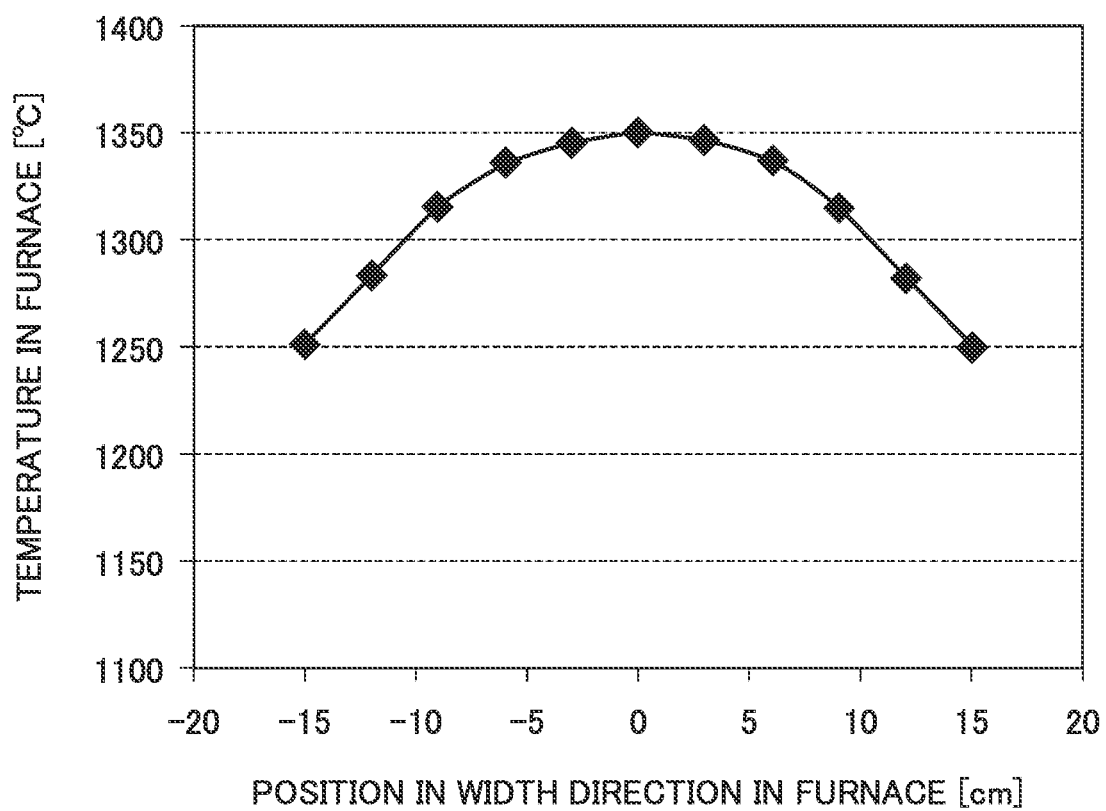
FIG. 12 is a graph illustrating an example of the temperature distribution in a hearth of a reducing furnace.
Figure 13:
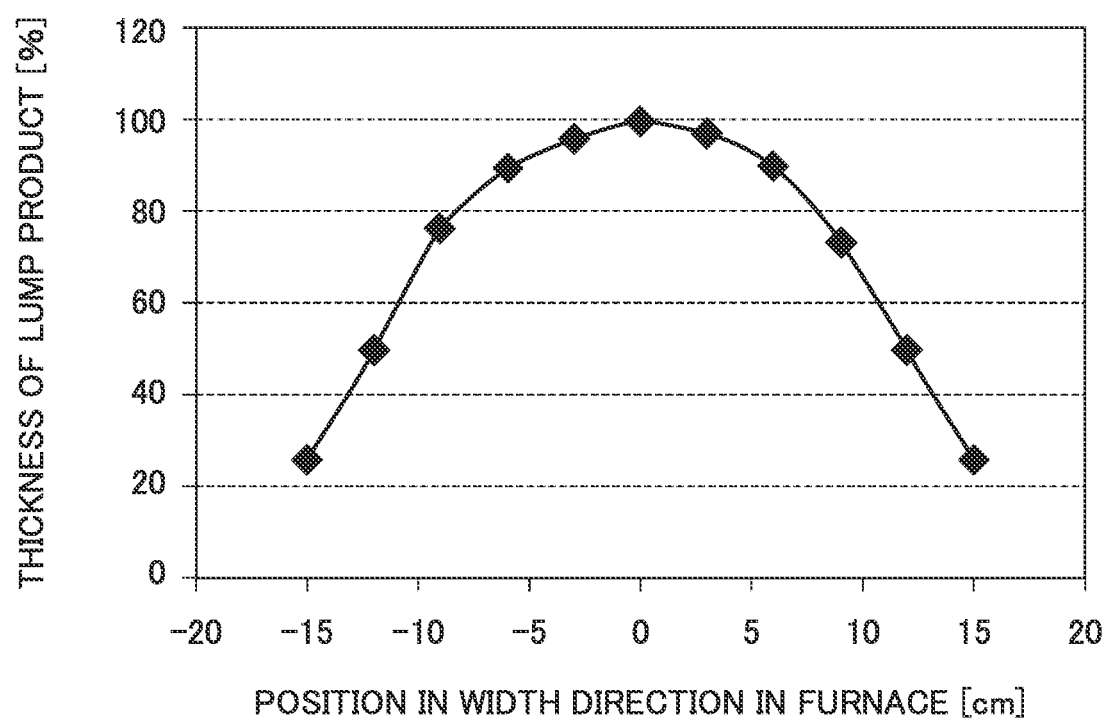
FIG. 13 is a graph illustrating the distribution of the thickness of a mixture-molded body in Example E1.
Figure 14:
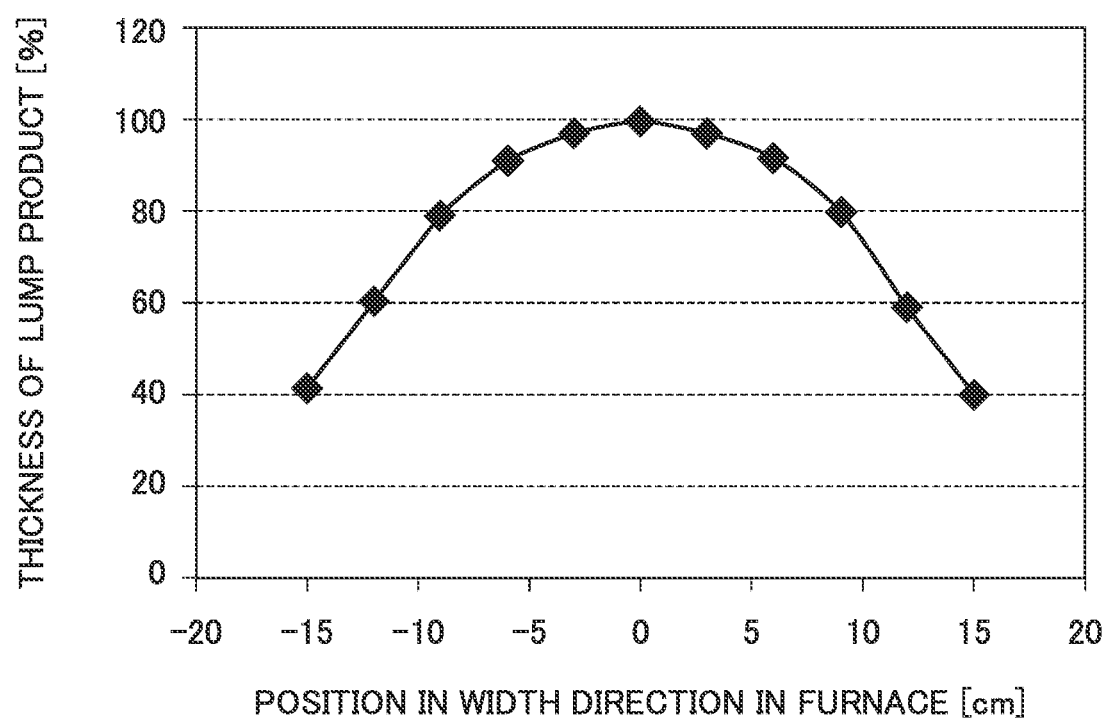
FIG. 14 is a graph illustrating the distribution of the thickness of a mixture-molded body in Example E2.
Figure 15:
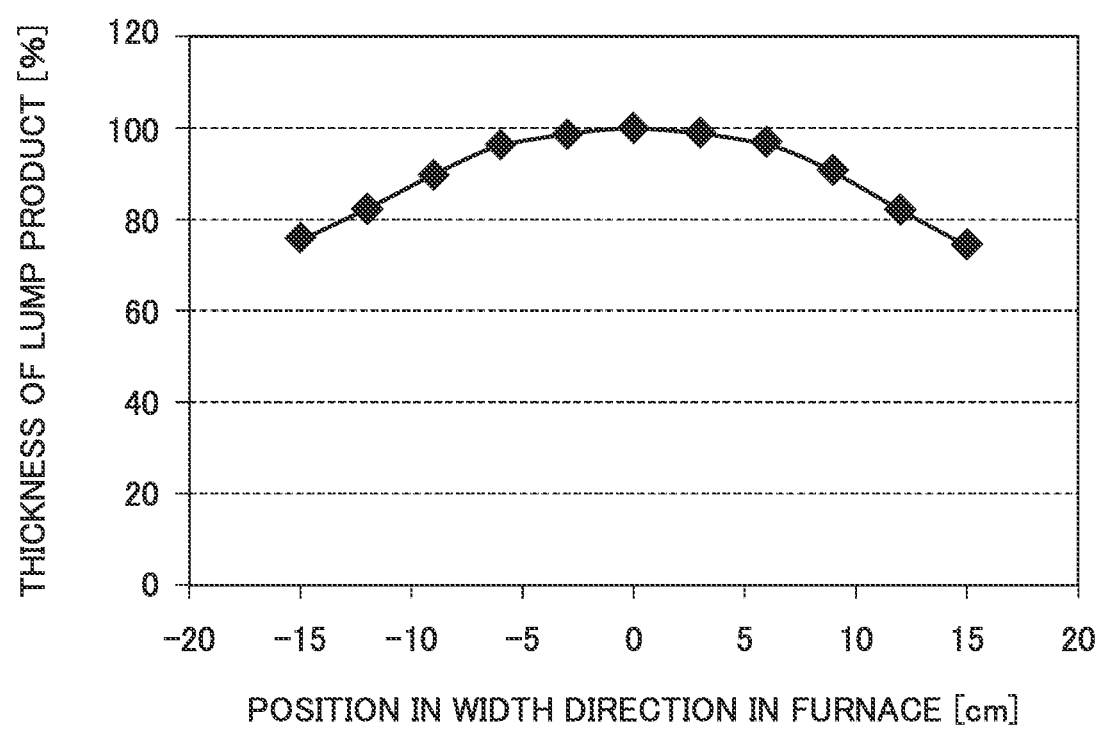
FIG. 15 is a graph illustrating the distribution of the thickness of a mixture-molded body in Example E3.
Figure 16:
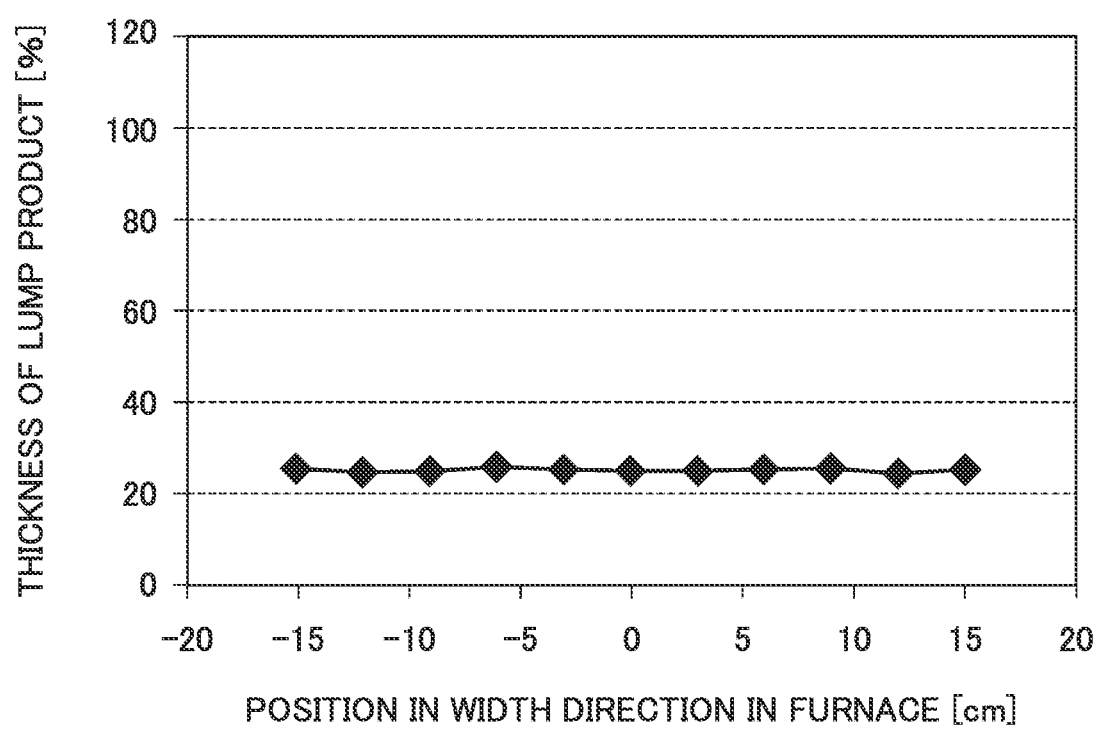
FIG. 16 is a graph illustrating the distribution of the thickness of a mixture-molded body in Comparative Example E1.
Figure 17:
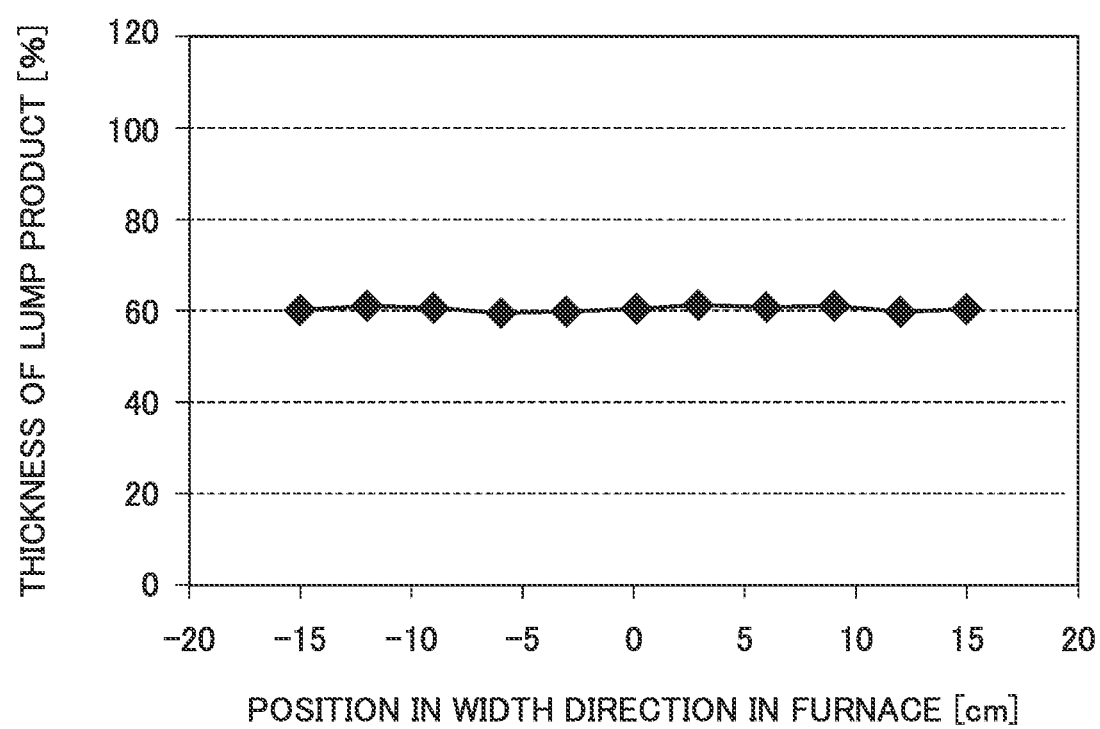
FIG. 17 is a graph illustrating the distribution of the thickness of a mixture-molded body in Comparative Example E2.
Figure 18:
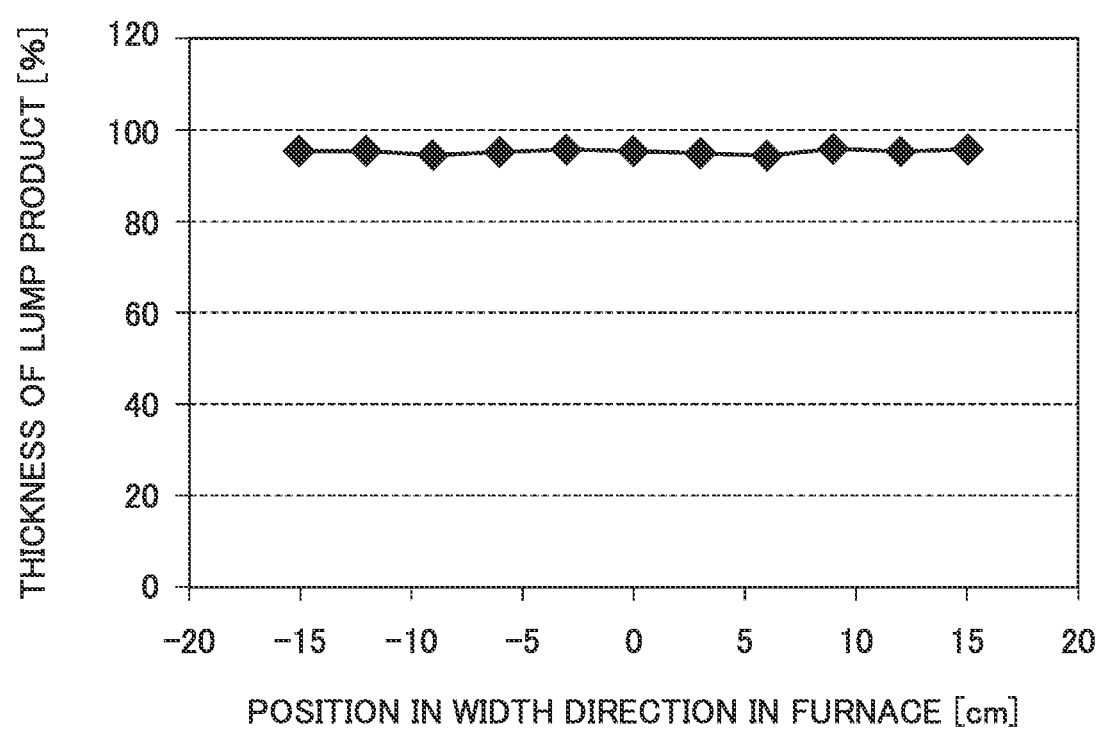
FIG. 18 is a graph illustrating the distribution of the thickness of a mixture-molded body in Comparative Example E3.

The temperature distribution was determined by heating the empty reducing furnace at 1350° C. to be the same as the reducing temperature upon molding of the mixture. The results on the temperature distribution when the position at which the temperature is the highest (the position at the center in the width direction in the furnace) in the hearth of the reducing furnace on which the sample is placed is taken as 0 [cm] are presented in FIG. 12. Here, the horizontal axis in FIG. 12 represents the position [cm] in the width direction in the furnace and the vertical axis represents the temperature [° C.] of the hearth. Incidentally, the temperature of the portion at which the temperature was the lowest in the range in which the sample was placed in the hearth of the reducing furnace when the empty reducing furnace was heated at 1350° C. was 1250° C.

Next, six samples were divided from the mixture obtained, and the mixture was molded into a substantially rectangular parallelepiped shape of which the planar shape was a rectangle of 300 mm in the width direction×400 mm in the traveling direction. Here, the "traveling direction" of the planar shape of the mixture is the direction in which the mixture travels when being placed in a movable hearth furnace, which is as a reducing furnace.

Among these samples, for the samples of Examples E1 to E3, the mixture was molded into a pellet so that the thickest place was the center in the width direction and the thinnest place was the end in the width direction. Here, the thicknesses of the thickest place and the thinnest place were set to be the relative values presented in Table 9 and the thickness between the thickest place and the thinnest place was set to be thinner as it is more distant from the center as in the temperature distribution illustrated in FIG. 13. On the other hand, for the samples of Comparative Examples E1 to E3, the mixture was molded so that the thickness was uniform. For each of Examples E1 to E3 and Comparative Examples E1 to E3, the relative values of the thicknesses of the samples when the center of the sample in the width direction is 0 [cm] and the thickness of the samples of Examples E1 to E3 at the center in the width direction is 100% are illustrated in FIGS. 13 to 18. Incidentally, the horizontal axis in FIGS. 13 to 18 represents the position [cm] of the sample in the width direction (the width direction in the furnace when the sample charged into the reducing furnace) and the vertical axis represents the relative value [%] of the thickness of the sample when the thickness of the samples of Examples E1 to E3 at the center in the width direction is 100%.

Next, each of the samples of Examples E1 to E3 and Comparative Example E1 to E3 was subjected to a drying treatment in which hot air at from 200° C. to 250° C. was blown onto the sample so that the sample had a solid content of about 70% by weight and a water content of about 30% by weight. The composition of solid components (excluding carbon) in the pellets (mixture-molded bodies) after being subjected to the drying treatment was about the same as those in Examples A1 to A9.

[Reduction and Heat Treatment of Mixture]

The pellets obtained after the drying treatment were charged one by one into a reducing furnace set to a nitrogen atmosphere which substantially did not contain oxygen while paying attention so that the center of the pellet in the width direction overlapped with the position at which the temperature was the highest in the hearth of the reducing furnace. The charging of the pellets into the reducing furnace was performed by spreading ash (containing $SiO_2$ as the main component and a small amount of oxides such as $Al_2O_3$ and MgO as other components) on the hearth of the reducing furnace in advance and placing the pellets thereon. Incidentally, the temperature condition at the time of charging into the reducing furnace was set to 500±20° C.

Next, the temperature of the reducing furnace was raised so that the temperature (reducing temperature) of the portion at which the temperature was the highest on the surface of the pellets charged into the furnace reached 1350° C. and the pellets were subjected to a reduction and heat treatment over the time presented in Table 9. After the reduction treatment, the sample was rapidly cooled to room temperature in the nitrogen atmosphere and then taken out into the air.

The metallized rate of nickel and the nickel content rate in the metal in each sample are presented in the following Table 9. Incidentally, the lowest temperature of the sample in Table 9 refers to the lowest temperature of the sample heated by the reduction and heat treatment (reducing temperature: 1350° C.) in the reducing furnace having temperature distribution, and it is also expressed in another word of the lowest reducing temperature.

TABLE 9

| | Pellet | | | | | | | |
|---|---|---|---|---|---|---|---|---|
| Sample | Thickness of thickest place [%] | Thickness of thinnest place [%] | Reducing temperature [° C.] | Lowest temperature of sample [° C.] | Reducing time [min] | Decrease value in thickness [%] (*1) | Metallized rate of Ni [%] | Ni content in metal [%] |
| Example E1 | 100 | 25 | 1350 | 1250 | 45 | 0.75 | 97.7 | 19.2 |
| Example E2 | 100 | 40 | 1350 | 1250 | 45 | 0.60 | 99.1 | 19.8 |
| Example E3 | 100 | 75 | 1350 | 1250 | 45 | 0.25 | 97.8 | 19.4 |
| Comparative Example E1 | 25 | 25 | 1350 | 1250 | 45 | 0.00 | 95.6 | 16.3 |
| Comparative Example E2 | 60 | 60 | 1350 | 1250 | 45 | 0.00 | 93.8 | 17.8 |
| Comparative Example E3 | 95 | 95 | 1350 | 1250 | 45 | 0.00 | 92.2 | 18.2 |

(*1): the "decrease value of thickness" in the above table means the decrease value of thickness every time the temperature decreases by 1.0° C. in the temperature distribution in the reducing furnace.

As presented in the results of Table 9, it has been found that it is possible to produce high grade ferronickel having a high metallized rate of nickel of 97.7% or more and a high nickel content in the metal of 19.2% or more as the thickness of the pellets is adjusted depending on the temperature distribution in the reducing furnace when the empty reducing furnace is heated (Example E1 to Example E3).

It is considered that the reason why high grade ferronickel can be produced in this manner is because the reduction reaction uniformly proceeds as the thickness of the pellets is adjusted depending on the temperature distribution in the reducing furnace.

In contrast, as presented in the results for Comparative Example E1 to Comparative Example E3, the metallized rate of nickel is 95.6% at the highest and the nickel content in the metal is 16.3% at the highest in a case in which the reduction treatment is performed by uniformly setting the thickness of the pellets to be charged regardless of the temperature distribution in the reducing furnace, and these are all lower values as compared with those in Examples.

Examples F1 to F12, Comparative Examples F1 to F2

[Mixing Treatment Step]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 200 μm) by using a mixing machine while adding an appropriate amount of water thereto. The carbonaceous reducing agent was contained in an amount to be a proportion of 20% when the amount of the carbonaceous reducing agent required for reducing nickel oxide contained in the nickel oxide ore, which was a raw material ore, and iron oxide ($Fe_2O_3$) without excess or deficiency was taken as 100%.

[Container Filling Step]

Next, the mixture obtained was divided into samples of No. F1 to No. F14, and among these, the mixture samples of No. F1 to No. F12 were filled into a container for reduction to prepare a mixture-filled container. The filling operation was manually performed, and the mixture was pushed into the container and filled so that a gap and a space were not formed. In addition, the mixture samples of No. F7 to No. F12 were filled into a container and then a lid was put on the container.

Meanwhile, the mixture sample of No. F13 was formed into a spherical pellet with ϕ 15±1.5 mm by hand kneading. In addition, the mixture sample of No. F14 was formed into a spherical pellet with ϕ 15±1.5 mm by using a pan type granulator.

Next, the mixture contained in the mixture-filled container and the pellets were subjected to a drying treatment in which hot air at from 300° C. to 400° C. was blown onto the mixture and the pellets so that the mixture and the pellets had a solid content of about 70% by weight and a water content of about 30% by weight. The composition of solid components (excluding carbon) in the mixture or pellet after being subjected to the drying treatment was about the same as those in Examples A1 to A9.

In the present Example, the treatments of the mixture-filled containers (No. F1 to No. F12) were denoted as Example F1 to Example F12 and the treatments of the spherical pellets of No. F13 and No. F14 were denoted as Comparative Example F1 and Comparative Example F2.

[Reducing Step]

Next, the mixture-filled containers (No. F1 to No. F12) and the pellets (No. F13 and No. F14) were charged into a reducing furnace and subjected to a reduction and heat treatment. Specifically, ash (containing $SiO_2$ as the main component and a small amount of oxides such as $Al_2O_3$ and MgO as other components) was spread on the hearth of the reducing furnace in advance and the mixture or pellet was placed thereon.

Thereafter, a nitrogen atmosphere which substantially did not contain oxygen was set, and the mixture in a state of being filled in a container or the pellet was charged into the reducing furnace. Incidentally, the temperature condition at the time of charging was set to 500±20° C.

Next, the reducing temperature was set to 1400° C., and the mixture or the pellet was reduced and heated in the reducing furnace. The treatment time was set to 15 minutes so that a metal shell was generated on the surface of the mixture and the reduction in the mixture efficiently proceeded. After the reduction treatment, the sample was rapidly cooled to room temperature in the nitrogen atmosphere and then taken out into the air.

The use/nonuse of container, the size of container, and the use/nonuse of lid in each sample are collectively presented in the following Table 10. In addition, the measurement results acquired by ICP analysis are presented.

TABLE 10

| Sample No. | Container With or without use | Container Size [mm] length × width × height | Use of lid | Metallized rate of nickel [%] | Ni content rate in metal [%] |
|---|---|---|---|---|---|
| Example F1 | Use | 800 × 800 × 400 | Nonuse | 95.1 | 19.0 |
| Example F2 | Use | 600 × 600 × 400 | Nonuse | 95.4 | 19.2 |
| Example F3 | Use | 600 × 600 × 200 | Nonuse | 95.9 | 19.6 |
| Example F4 | Use | 400 × 400 × 80 | Nonuse | 96.1 | 20.0 |
| Example F5 | Use | 150 × 150 × 80 | Nonuse | 96.7 | 20.8 |
| Example F6 | Use | 150 × 150 × 20 | Nonuse | 96.2 | 20.3 |
| Example F7 | Use | 800 × 800 × 400 | Use | 98.0 | 21.1 |
| Example F8 | Use | 600 × 600 × 400 | Use | 98.3 | 21.5 |
| Example F9 | Use | 600 × 600 × 200 | Use | 98.2 | 21.9 |
| Example F10 | Use | 400 × 400 × 80 | Use | 99.0 | 23.1 |
| Example F11 | Use | 150 × 150 × 80 | Use | 99.3 | 23.5 |
| Example F12 | Use | 150 × 150 × 20 | Use | 99.7 | 23.7 |
| Comparative Example F1 | Nonuse | — | Nonuse | 94.8 | 18.5 |
| Comparative Example F2 | Nonuse | — | Nonuse | 94.2 | 18.3 |

As presented in the results of Table 10, it has been found that it is possible to favorably metallize nickel in the mixture and to produce high grade ferronickel having a high nickel content of from 19.0% to 23.7% as a mixture-filled container prepared by filling a mixture into a container is charged into a reducing furnace and subjected to a reduction and heat treatment (Example F1 to Example 12). In addition, as presented in the results particularly for Example F7 to Example F12, it has been found that it is possible to further increase the metallized rate of nickel as the treatment is performed in a state in which a lid is put on the container.

It is considered that the reason why favorable ferronickel can be produced in this manner is because a metal shell is uniformly and stably generated on the surface of the mixed part as the mixture in a state of being filled in a container is subjected to a reduction and heat treatment and a reduction reaction uniformly and stably takes place without leakage of the reducing agent in the metal shell by this.

In contrast, as presented in the results for Comparative Example F1 and Comparative Example F2, the metallized rate of nickel was low on the average and the nickel content in the metal was also about 18% to be a low value as ferronickel in the case of using a spherical pellet as compared with Example F1 to Example F12.

Examples G1 to G4, Comparative Examples G1 to G2

[Mixing and Kneading of Raw Material Powder]

A mixture was obtained by mixing nickel oxide ore as a raw material ore, iron ore, quartz sand and limestone which were flux components, a binder, and a carbonaceous reducing agent (coal powder, carbon content: 85% by weight, average particle diameter: about 200 μm) by using a mixing machine while adding an appropriate amount of water thereto. The carbonaceous reducing agent was contained in an amount to be a proportion of 20.0% when the amount of the carbonaceous reducing agent required for reducing nickel oxide contained in the nickel oxide ore, which was a raw material ore, and iron oxide (Fe$_2$O$_3$) without excess or deficiency was taken as 100%.

Next, six samples were divided from the mixture obtained, and the samples of Examples G1 to G4 were kneaded by using a twin-screw kneader (model name: HYPERKTX, manufactured by KOBE STEEL, LTD.). Among these, for the samples of Examples G3 and G4, the samples after being kneaded were extruded through the twin-screw kneader. By these kneading and extrusion, the sample after being kneaded and extruded was molded into a pellet so as to have a spherical shape with φ 15±1.5 mm. In addition, for the samples of Examples G1 and G2, the sample after being kneaded was used as a pellet as it was. Subsequently, the samples of Examples G2 and G4 were filled into a cylindrical container, which was made of heat-resistant porcelain and had an inner diameter of the bottom surface of 100 mm and an inner dimension of the height of 30 mm and the pellets were manually pushed into the container so that a gap and a space were not formed, thereby obtaining a mixture-filled container.

On the other hand, for the sample of Comparative Example G1, the mixture was molded into a spherical shape with φ 15±1.5 mm by hand kneading. In other words, kneading was not performed. In addition, the sample of Comparative Example G2 was also molded into a spherical shape with φ 15±1.5 mm by using a pan type granulator without being kneaded. Thereafter, the samples of Comparative Examples G1 and G2 were filled into the same containers as those in Examples G2 and G4 and the mixture was manually pushed into the container so that a gap and a space were not formed.

Next, each of the samples of Examples G1 to G4 and Comparative Examples G1 and G2 was subjected to a drying treatment in which hot air at from 300° C. to 400° C. was blown onto the sample so that the sample had a solid content of about 70% by weight and a water content of about 30% by weight. The composition of solid components (excluding carbon) in the mixture-molded body (pellet, mixture-filled container) after being subjected to the drying treatment was about the same as those in Examples A1 to A9.

[Reduction and Heat Treatment of Mixture]

The mixture-molded bodies obtained after the drying treatment were each charged into a reducing furnace set to a nitrogen atmosphere which substantially did not contain. The charging of the mixture-molded body into the reducing furnace was performed by spreading ash (containing SiO$_2$ as the main component and a small amount of oxides such as Al$_2$O$_3$ and MgO as other components) on the hearth of the reducing furnace in advance and placing the mixture-molded body thereon. Incidentally, the temperature condition at the time of charging was set to 500±20° C.

Next, the temperature of the reducing furnace was raised so that the temperature (reducing temperature) of the portion at which the temperature was the highest on the surface of the mixture-molded body charged into the furnace reached 1400° C. and the mixture-molded body was subjected to a reduction and heat treatment. The treatment time by the reduction and heat treatment was set to 15 minutes. After the reduction treatment, the sample was rapidly cooled to room temperature in the nitrogen atmosphere and then taken out into the air.

The metallized rate of nickel and the nickel content rate in the metal in each sample are presented in the following Table 11.

TABLE 11

| Sample | Kneading | Extrusion | With or without filling into container | Metallized rate of Ni [%] | Ni content in metal [%] |
|---|---|---|---|---|---|
| Example G1 | With | Without | Without | 98.7 | 19.0 |
| Example G2 | With | Without | With | 98.9 | 19.3 |
| Example G3 | With | With | Without | 99.3 | 19.5 |
| Example G4 | With | With | With | 99.5 | 20.1 |
| Comparative Example G1 | Without | Without | With | 94.7 | 18.2 |
| Comparative Example G2 | Without | Without | With | 94.1 | 18.0 |

As presented in the results of Table 11, it has been found that it is possible to produce high grade ferronickel having a high metallized rate of nickel of 98.7% or more and a high nickel content in the metal of 19.0% or more as the mixture containing nickel oxide ore is kneaded (Example G1 to Example G4). Particularly in Examples G3 and G4 in which the sample after being kneaded was extruded through a twin-screw kneader, it has been found that it is possible to produce higher grade ferronickel having a high metallized rate of nickel of 99.3% or more and a high nickel content in the metal of 19.5% or more.

It is considered that the reason why high grade ferronickel can be produced in this manner is because a uniform and stable reduction reaction takes place as the mixture containing nickel oxide ore is kneaded.

In contrast, as presented in the results for Comparative Example G1 and Comparative Example G2, the metallized rate of nickel is 94.7% at the highest and the nickel content in the metal is 18.2% at the highest in a case in which the mixture containing nickel oxide ore is subjected to a reduction treatment without being kneaded, and these are all lower values as compared with those in Examples.

EXPLANATION OF REFERENCE NUMERALS 1a to 1d PELLET
10 PELLET LAMINATE
2 CONTAINER
D DIAMETER OF CIRCULAR SURFACE OF DISK-SHAPED PELLET
H HEIGHT OF DISK-SHAPED PELLET
t THICKNESS OF PELLET
h SHORTEST LENGTH FROM CENTER TO SURFACE OF PELLET
G CENTER OF PELLET
S1 MIXING TREATMENT STEP
S11 MIXING STEP
S12 KNEADING STEP
S2 MIXTURE-MOLDING STEP
S21a LUMPING TREATMENT STEP
S21b CONTAINER FILLING STEP
S211 MOLDING STEP
S212 CUTTING STEP
S22 DRYING TREATMENT STEP
S3 REDUCING STEP
S31a PELLET LAMINATING STEP
S31b CHARGING STEP
S32a and S32b HEAT TREATMENT STEP
S4 SEPARATING STEP

The invention claimed is:

1. A nickel oxide ore smelting method for producing ferronickel by reducing a mixture containing a nickel oxide ore, the method comprising;
   a mixing treatment step for mixing at least the nickel oxide ore and a carbonaceous reducing agent;
   a mixture-molding step for molding the mixture obtained to obtain a mixture-molded body; and
   a reducing step for heating the mixture-molded body obtained at a predetermined reducing temperature in a reducing furnace,
   wherein in the mixture-molding step, the nickel oxide ore and the carbonaceous reducing agent are mixed, so that a proportion of the carbonaceous reducing agent is 5.0% or more and 40.0% or less, when a total value of chemical equivalents of the carbonaceous reducing agent required for reducing nickel oxide and iron oxide constituting the nickel oxide ore without excess or deficiency is taken as 100%, and
   wherein the mixture is molded into a rod shape or a cylindrical shape, and the mixture-molded body obtained is cut into a flat plate-shaped or disk-shaped pellet in the mixture-molding step.

2. The nickel oxide ore smelting method according to claim 1, wherein a movable hearth furnace is used as the reducing furnace and the flat plate-shaped or disk-shaped pellet is charged into the movable hearth furnace and reduced and heated in the reducing step.

3. The nickel oxide ore smelting method according to claim 1, wherein the reducing temperature in the reducing step is 1250° C. or more and 1450° C. or less.

4. The nickel oxide ore smelting method according to claim 1, further comprising a separating step for separating slag and obtaining the ferronickel after the reducing step is performed.

5. The nickel oxide ore smelting method according to claim 1, wherein the mixture-molding step comprises a drying treatment step of drying the mixture-molded body, so that a content of $Fe_2O_3$ contained in 100 parts by weight of a solid content of the mixture-molded body after the drying treatment step is in a range of 50 parts by weight or more and 60 parts by weight or less.

6. A nickel oxide ore smelting method for producing ferronickel by reducing a mixture containing a nickel oxide ore, the method comprising:
   a mixing treatment step for mixing at least the nickel oxide ore and a carbonaceous reducing agent;
   a mixture-molding step for molding the mixture obtained to obtain a mixture-molded body; and
   a reducing step for heating the mixture-molded body obtained at a predetermined reducing temperature in a reducing furnace,
   wherein in the mixture-molding step, the nickel oxide ore and the carbonaceous reducing agent are mixed, so that a proportion of the carbonaceous reducing agent is 5.0% or more and 40.0% or less, when a total value of chemical equivalents of the carbonaceous reducing agent required for reducing nickel oxide and iron oxide constituting the nickel oxide ore without excess or deficiency is taken as 100%, and
   wherein a pellet is formed as the mixture-molded body in the mixture-molding step, and
   the pellet is laminated to form a pellet laminate and the pellet laminate is charged into the reducing furnace and subjected to the heating in the reducing step.

7. The nickel oxide ore smelting method according to claim 6, wherein the mixture is molded into the pellet having a cubic shape, a rectangular parallelepiped shape or a cylindrical shape in the mixture-molding step.

8. The nickel oxide ore smelting method according to claim 6, wherein the mixture is molded into a volume of 8000 $mm^3$ or more in the mixture-molding step.

9. The nickel oxide ore smelting method according to any one of claims 6 to 8, wherein a movable hearth furnace is used as the reducing furnace and the pellet laminate is charged into a hearth of the movable hearth furnace and subjected to the heating in the reducing step.

10. A nickel oxide ore smelting method for producing a metal or an alloy by reducing a mixture containing a nickel oxide ore, the method comprising:
   a mixing treatment step for mixing at least the nickel oxide ore and a carbonaceous reducing agent;
   a mixture-molding step for molding the mixture obtained to obtain a mixture-molded body;
   a reducing step for heating the mixture-molded body obtained at a predetermined reducing temperature in a reducing furnace,
   wherein in the mixture-molding step, the nickel oxide ore and the carbonaceous reducing agent are mixed, so that a proportion of the carbonaceous reducing agent is 5.0% or more and 40.0% or less, when a total value of chemical equivalents of the carbonaceous reducing agent required for reducing nickel oxide and iron oxide constituting the nickel oxide ore without excess or deficiency is taken as 100%, and
   wherein the mixture is molded by being filled into a predetermined container, followed by compacting the resultant mixture which is filled in the container, and a mixture-filled container is obtained as the mixture-molded body, in the mixture-molding step.

11. The nickel oxide ore smelting method according to claim 10, wherein the mixture-filled container is heated in a state of having a lid on the mixture-filled container in the reducing step.

12. The nickel oxide ore smelting method according to claim 10, wherein the container has a rectangular parallelepiped shape or a cubic shape.

13. The nickel oxide ore smelting method according to claim 10, wherein a movable hearth furnace is used as the reducing furnace and the mixture-filled container is charged into the movable hearth furnace and reduced and heated in the reducing step.

14. The nickel oxide ore smelting method according to claim 10, wherein ferronickel is obtained as the alloy.

* * * * *